United States Patent [19]
Carson

[11] Patent Number: 5,664,464
[45] Date of Patent: Sep. 9, 1997

[54] LOW STRESS ENGINE FOR CONVERTING MOTION BETWEEN RECIPROCATING AND ROTATIONAL MOTION

[76] Inventor: Douglas Timothy Carson, 3721 Spyglass La., Lincoln, Nebr. 68507

[21] Appl. No.: 370,729

[22] Filed: Jan. 10, 1995

[51] Int. Cl.⁶ .................. F16C 3/20; F02B 75/32
[52] U.S. Cl. .................. 74/603; 74/595; 123/197.4
[58] Field of Search .................. 74/595, 596, 603, 74/604; 123/192.2, 197.4

[56] References Cited

U.S. PATENT DOCUMENTS

| | | | |
|---|---|---|---|
| 4,311,120 | 1/1982 | Freyn et al. | 74/604 |
| 4,407,169 | 10/1983 | Menen | 74/604 |
| 4,485,769 | 12/1984 | Carson . | |
| 4,509,378 | 4/1985 | Brown | 74/603 |
| 4,543,919 | 10/1985 | Carson . | |
| 4,550,571 | 11/1985 | Bertsch | 74/579 R |
| 4,617,885 | 10/1986 | Oshiro et al. | 74/603 |
| 4,658,768 | 4/1987 | Carson . | |
| 4,932,373 | 6/1990 | Carson . | |
| 4,966,043 | 10/1990 | Frey | 74/52 |
| 5,033,945 | 7/1991 | Kolb | 74/603 |
| 5,282,397 | 2/1994 | Harkness et al. | 74/603 |

*Primary Examiner*—Rodney H. Bonck
*Assistant Examiner*—Mary Ann Battista
*Attorney, Agent, or Firm*—Vincent L. Carney

[57] ABSTRACT

To boost RPM and to minimize the back and forth transfer of kinetic energy between a crank and a connector/reciprocating member in mechanisms having a stroke that is four times the crankpin offset, a connector which attaches the reciprocating member to the crank is weighted with counterweights to produce an effective connector center of mass at a location on the connector that, while rotating around the crankpin defines a motion perpendicular to the oscillation of the reciprocating member such that the resulting translational inertia of the connector is equal to but perpendicular and ninety degrees out of phase with the translational inertia of the reciprocating member so that their combined kinetic energy is constant, thus resulting in a zero transfer in energy between the crank and the connector/reciprocating member through each revolution unless external force is applied to the crank or to the reciprocating member.

22 Claims, 4 Drawing Sheets

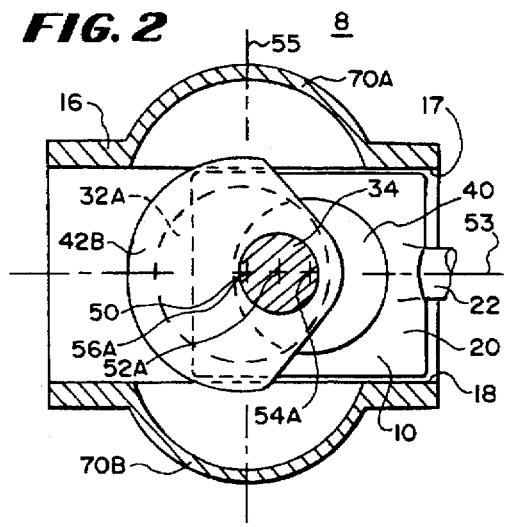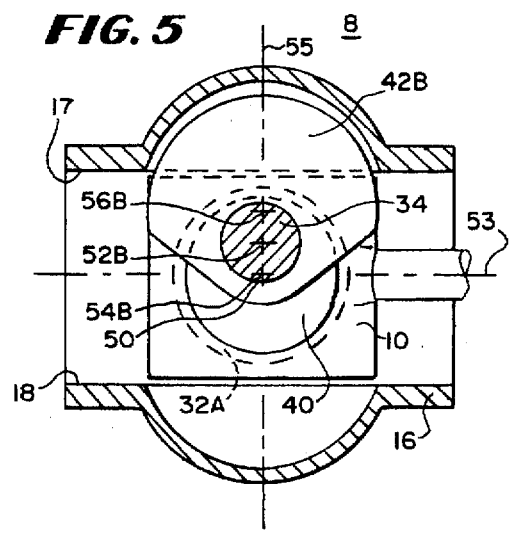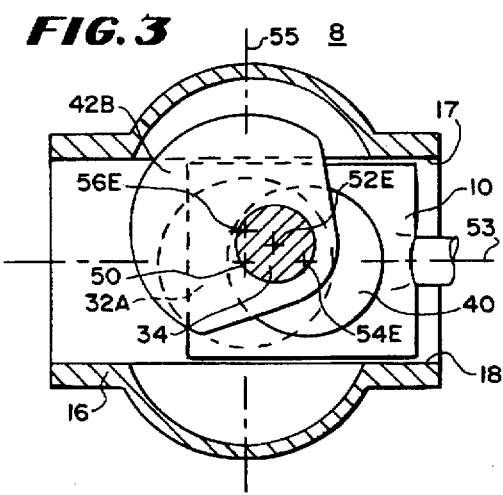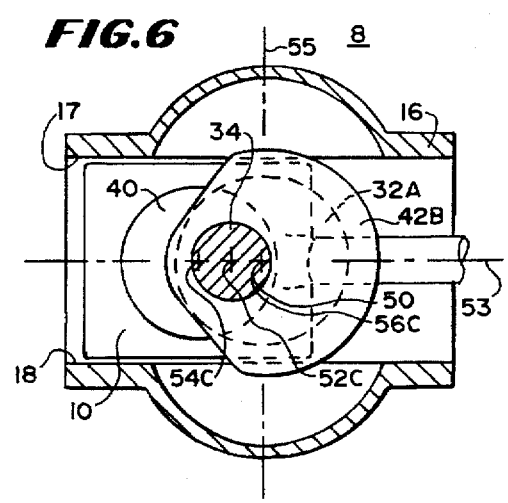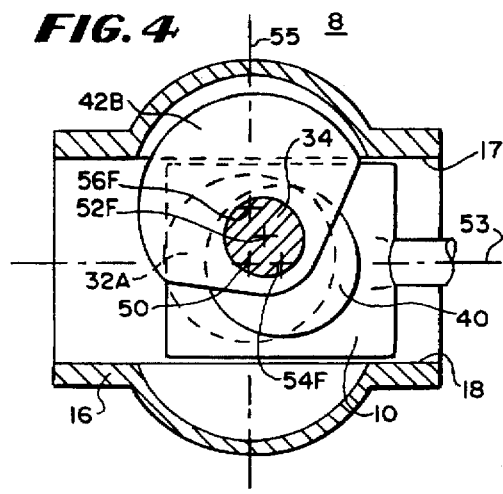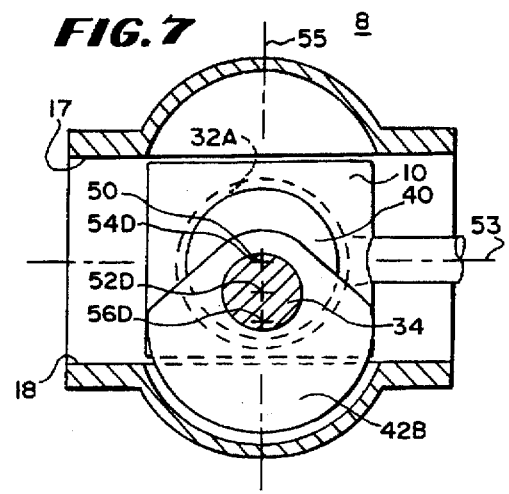

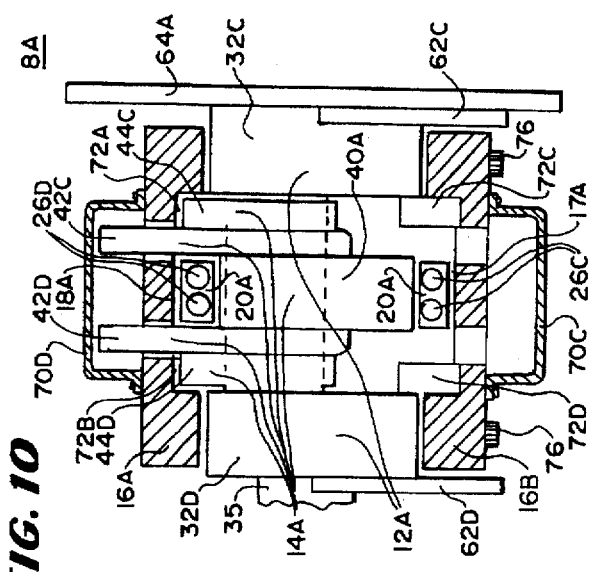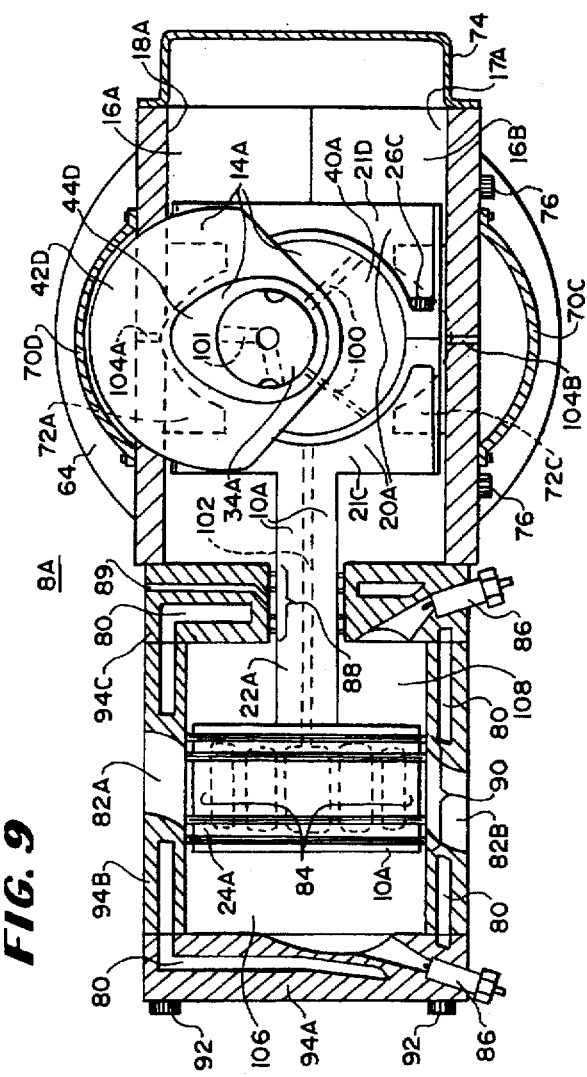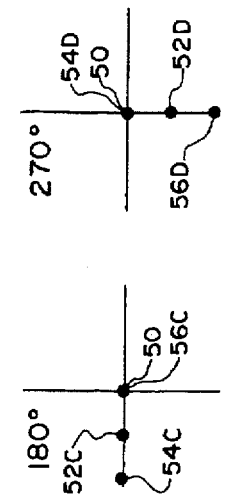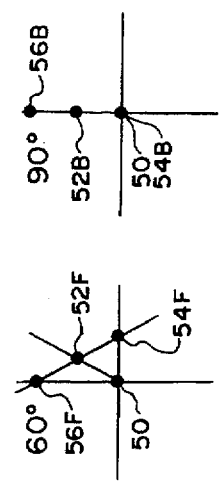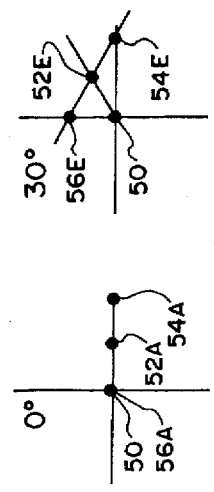

0°

0°

30°

30°

60°

60°

90°

90°

LOW STRESS ENGINE FOR CONVERTING MOTION BETWEEN RECIPROCATING AND ROTATIONAL MOTION

BACKGROUND OF THE INVENTION

This invention relates to machines having a reciprocating member that is coupled to a rotatable member and more particularly to the type of machine in which the rotatable member is connected to the reciprocating member in such a way as to produce a stroke that is four times the crankpin offset.

Such machines include one or more reciprocating members that drive a crankshaft through a connecting rod or other connector and/or a crankshaft that drives one or more reciprocating members through a connecting rod and/or other connector. Such machines may transfer kinetic energy back and forth between the crank and the reciprocating member or members. Examples of types of machines that may have a rotatable member connected to the reciprocating member in such a way as to produce a stroke that is four times the crankpin offset are engines, pumps, compressors and mechanisms that convert rotary motion to reciprocating motion and vice versa.

To provide kinetic energy and to minimize vibrations, these mechanisms utilize flywheels and/or a number of reciprocating members to minimize fluctuations in the angular velocity of the crank. In the case of a single piston engine, making the flywheel larger reduces the change in angular velocity of the crank at the top of the stroke when the piston is essentially not moving compared to near midstroke when the piston reaches its maximum speed. Multiple piston engines can space the angle between pistons do not only balance or partially balance the momentums of the pistons but to also minimize changes in the angular momentum of the crank. Both methods require a constant transfer of energy sack and forth from the crankpin to the connecting rod or connector. This results in large forces and friction between the crankpin and the connecting rod or connector at higher RPMs (revolutions per minute).

In those engines and motion converting mechanisms that have a stroke that is four times the crankpin offset and utilize connectors instead of connecting rods, the transfer of energy back and forth between the crankpin and the reciprocating member is even further limiting than just large forces and resulting friction. At the top part of the stroke and at the bottom part of the stroke, the energy is transferred from the crankpin through the connector to the reciprocating member and vice versa. However, this does not occur through a portion of midstroke where there is a second degree of freedom that partially uncouples the primary interface from the crankpin through the connector to the reciprocating member. The energy must be transferred by an intermittent secondary interface.

The secondary interface between the crank and the reciprocating member disclosed in U.S. Pat. No. 4,658,768 issued to Douglas T. Carson on Apr. 21, 1987, for ENGINE and the secondary interface between the connector and the housing as disclosed in U.S. Pat. No. 4,932,373 issued to Douglas T. Carson on Jun. 12, 1990, for MOTION CONVERTING MECHANISM, the disclosures of which are incorporated herein by reference eliminate the second degree of freedom through midstroke.

The forces through this center portion of the stroke are much less than they are in other portions of the stroke, especially if the combustion stroke of an engine where the force from the piston drops off rapidly as the piston moves away from the top of the stroke. Likewise, forces climb rapidly during compression in engines, pumps, and compressors as the piston moves towards the top of the stroke. Because of this, the design of the intermittent secondary interface can generally be much less rugged than that of the primary interface as taught in U.S. Pat. 4,932,373 issued to Douglas T. Carson on Jun. 12, 1990. This is applicable for low and medium RPM machines but would require an ever increasing larger and more rugged secondary interface as the higher RPMs are achieved.

The primary interface which is designed to withstand large forces such as those resulting from combustion and compression can also withstand those forces that occur at the higher RPM machines where the reciprocating member is rapidly slowing down, changing direction, and then speeding up again. This is not typical of the secondary interface, at higher RPMs, as the force necessary to transfer energy back and forth from the crankpin to the reciprocating member approaches the external forces encountered by the primary interface during compression and combustion.

The prior art motion converting mechanism have several disadvantages, such as for example: (1) they restrict the upper limit on RPM and/or demand a larger, more rugged, and more costly secondary interface; (2) the resulting friction encountered by the secondary interface is excessively high; (3) the energy transferred back and forth between the crank and the connector/reciprocating mechanism results in momentary fluctuations in crankshaft RPM where the RPM is higher at the ends of the stroke than through midstroke; and (4) they require additional moving components, as described in U.S. Pat. Nos. 4,658,768 and 4,932,373 (see above), other than the basic unit consisting of one crank assembly, one connector and one reciprocating member to fully balance the machine.

SUMMARY OF THE INVENTION

Accordingly, it is an object of the invention to provide a novel machine having a reciprocating member coupled to a rotary member.

It is a further object of the invention to provide a machine in which the reciprocating member is coupled to the rotary member by a connector to reduce machine size.

It is a still further object of the invention to provide a machine in which the reciprocating member is coupled to the rotary member by a connector to reduce vibrations.

It is a still further object of the invention to provide a machine in which the reciprocating member is coupled to the rotary member by a special connector that includes connector counterweights resulting in a connector of size, mass and dimension reduce and/or eliminate the transfer of energy back and forth from the crank to the reciprocating member throughout the stroke.

It is a still further object of the invention to provide a machine that includes a reciprocating member coupled to a rotary member by a special connector with connector counterweights and also incorporates an intermittent secondary interface to insure continuity of reciprocating member movement through the center of each stroke.

It is a still further object of the invention to provide a machine that includes a reciprocating member coupled to a rotary member by a special connector with connector counterweights and also includes an intermittent secondary interface between the crank and the reciprocating member to insure continuity of reciprocating member movement through the center of each stroke.

It is a still further object of the invention to provide a machine that includes a reciprocating member coupled to a rotary member by a special connector With connector counterweights and also includes an intermittent secondary interface between the connector and the housing to insure continuity of reciprocating member movement through the center of each stroke.

It is a still further object of the invention to provide a machine in which the reciprocating member is coupled to the rotary member by a special connector with connector counterweights resulting in a connector of size, mass, and dimensions to reduce and/or eliminate inertia forces on the secondary interface.

It is a still further object of the invention to provide machine in which the reciprocating member is coupled to the rotary member by a special connector with connector counterweights resulting in a connector of size, mass and dimension to limit the forces encountered by the secondary interface to only the external for encountered by the reciprocating member regardless of RPM.

It is still further object of the invention to provide a machine in which the reciprocating member is coupled to the rotary member by a special connector with connector counterweights resulting in a connector of size, mass and dimension to minimize the need of a secondary interface for applications where the reciprocating member encounters external forces only at the ends of the stroke.

It is a still further object of the invention to provide a machine in which the reciprocating member is coupled to the rotary member by a special connector with connector counterweights resulting in a connector of size, mass and dimension such that the combined inertia forces of the reciprocating member, the connector and the crank with the crank counterweights balance.

It is a still further object of the invention to provide a machine in which the reciprocating member is coupled to the rotary member by a connector with connector counterweights resulting in a connector of size, mass and dimension such that the machine can be fully balanced with just three moving parts: the crank assembly with crank counterweights, the reciprocating member and the connector with connector counterweights.

It is a still further object of the invention to provide a reciprocating piston engine in which the crank undergoes less stress in maintaining a reciprocating motion for the piston(s).

It is a still further object of the invention to provide high RPM reciprocating piston engine in which a primary mechanism is utilized to transfer the larger forces/lower velocities encountered by the reciprocating member to the crank and in which, in addition, an intermittent secondary interface is utilized to transfer the smaller forces/higher velocities encountered by the reciprocating member to the crank.

It is a still further object of the invention to provide reciprocating piston engines, pumps, compressors and various other reciprocating mechanisms that are economical in construction.

It is a still further object of the invention to provide a reciprocating piston engine with a connector between the reciprocating member and the crank that increases maximum fuel burn time per revolution for diesel engines.

In accordance with the above and further objects of the invention, a reciprocating member confined to reciprocation by a housing is attached to a crankpin of a rotatable crankshaft by a connector. The connector: (1) includes connector counterweights; (2) has a predetermined special size, mass and dimension; (3) rotates in an angular direction opposite that of the crankshaft; (4) has a stroke four times the crankpin offset in an axis of reciprocation; (5) has a motion of the center of mass of the connector that is an elliptical path with its major axis in a direction perpendicular to the axis of reciprocation; and (6) has a mass equal to that of the reciprocating member as the major axis approaches a straight line. The machine may include a secondary interface between the crank and the reciprocating member or between the connector and the housing.

The crank assembly has counterweights that oppose the inertia force (inertia vector) of the reciprocating member in the axis of reciprocation and oppose the inertia force (inertia vector) of the connector in the axis perpendicular to the axis of reciprocation.

The reciprocating member is confined to reciprocating motion by the walls of a housing that houses the crank, the connector and the rod assembly portion of the reciprocating member. The rod assembly in turn confines the center of rotation of the connector to reciprocating motion The housing walls thus restrict the rod assembly and the center of connector rotation to reciprocating motion in which the resulting velocity is equal to twice the velocity of the crankpin center in the direction of reciprocation.

The center of connector rotation which is confined to reciprocation is a distance of one crankpin radius from the crankpin center. To eliminate the transfer of energy back and forth between the crankpin and the reciprocating member, the novel connector has a mass equal to the reciprocating member and a center of mass located one crankpin radius from the center of the crankpin in the direction opposite that of the center of connector rotation. The center of connector rotation revolves around the crankpin while it reciprocates within the reciprocating member as the connector's center of mass revolves around the crankpin while moving in a straight line perpendicular to the direction of reciprocation.

The distance between the connector's center of rotation and its center of mass is twice the crankpin offset. The hole in the connector that receives the crankpin is located centrally between the connector's center of rotation and its center of mass. As the crankpin rotates the connector's center of rotation reciprocates within the reciprocating member while revolving around the crankpin with an angular velocity that is equal and opposite the angular velocity of the crankpin.

The angular velocity of the connector's center of mass is the same as the connector's center of rotation and its motion is perpendicular to that of the connector's center of rotation. The connector's center of rotation defines the velocity and energy of the reciprocating member in the direction of reciprocation while the connector's center of mass defines the velocity and energy of the connector in a direction perpendicular to the direction of reciprocation and ninety degrees out of phase with the reciprocating member.

When the connector's center of rotation is at its maximum velocity, its center of mass has a zero velocity and vice versa. The combined energy of the reciprocating member moving in a direction of reciprocation and that energy of the connector which, while revolving around the crankpin, is moving in a direction perpendicular to reciprocation are thus constant.

The translational inertia force (inertia vector) of the reciprocating member in the direction of reciprocation and also the translational inertia force (inertia vector) of the connector in the direction perpendicular to the direction of reciprocation are ninety degrees out of phase and are opposed by crank counterweights positioned on the crank assembly opposite the crankpin. The crank counterweights oppose the inertia force (inertia vector) of the reciprocating member at the ends of the stroke, the connector inertia force (inertia vector) a midstroke, and the combined inertia forces (inertia vector) of the reciprocating member and the connector through the rest of the stroke. The machine may be fully balanced with only three moving parts: the crank assembly with crank counterweights, the special connector with connector counterweights and the reciprocating member.

In another embodiment, the center of connector rotation, which is confined to reciprocation, is a distance of one crankpin radius from the crankpin center. To eliminate the transfer of energy back and forth between the crankpin and the reciprocating member, the novel connector has a mass equal to the mass of the reciprocating member times one crankpin radius divided by the distance from the connector's center of mass to the crankpin center where the crankpin center is on a line between the center of connector rotation and the connector's center of mass. The center of connector rotation revolves around the crankpin while it reciprocates within the reciprocating member as the connector's center of mass revolves around the crankpin while moving in an ellipse with a major axis perpendicular to the direction of reciprocation.

The angular velocity of the connector's center of mass is the same as the connector's center of rotation and its motion is primarily perpendicular to that of the connector's center of rotation. The connector's center of rotation defines the velocity and energy of the reciprocating member in the direction of reciprocation while the connector's center of mass defines the velocity and energy of the connector in th form of an ellipse with the major axis in a direction perpendicular to the direction of reciprocation and ninety degrees out of phase with the reciprocating member.

When the connector's center of rotation is at its maximum velocity, its center of mass is at its minimum velocity with a zero component in the direction perpendicular to the axis of reciprocation and when the connector's center of mass is at its maximum velocity, its center of rotation has a zero velocity. The combined energy of the reciprocating member and of the connector are constant.

The combined translational inertia forces (inertia vector) of the reciprocating member in the direction of reciprocation and the component inertia force (inertia vector) of the connector in the same direction and the component translational inertia force (inertia vector) of the connector in the direction perpendicular to the direction of reciprocation are ninety degrees out of phase and are opposed by the crank counterweights positioned on the crank assembly opposite the crankpin. The crank counterweights oppose the inertia force (inertia vector) of the connector at midstroke and the combined inertia forces (inertia vector) of the reciprocating member and the connector at the ends of the strokes and through the rest of the stroke. The machine may be fully balanced with only three moving parts: the crank assembly with crank counterweights, the special connector with connector counterweights and the reciprocating member.

In one embodiment, a two cycle engine uses a double acting piston as part of the reciprocating member, a connector with connector counterweights resulting in a connector of mass, size and dimension to eliminate the transfer of energy back and forth between the crank and the reciprocating member and a crank assembly with counterweights to produce two power strokes per revolution with substantially no vibrations from inertia forces (inertia vectors).

This motion converting mechanism has several advantages, such as: (1) it is economical, particularly in two cycle diesel engines since large number of cylinders are not required to balance the inertia forces (inertia vectors); (2) it provides reduced size in engines, pumps compressors and other rotary to reciprocating mechanisms that are balanced so as to be relatively vibration free; (3) it provides a more economical mechanism due to less continuous crank stress and corresponding friction; (4) it allows higher RPMs without requiring a correspondingly larger and more rugged secondary interface; (5) it provides a simpler method of balancing all inertia forced (inertia vectors) for engines, pumps, compressors and various other mechanisms that convert rotary motion to reciprocating motion and vice versa by requiring only three moving parts: one crank assembly, one connector and one reciprocating member.

SUMMARY OF THE DRAWINGS

The above noted and other features of the invention will be understood more completely from the following detailed description when considered with reference to the accompanying drawings in which:

FIG. 2 is a simplified view, in section, illustrating a first stage in the operation of the embodiment of FIG. 1;

FIG. 3 is a simplified view, in section, illustrating a second stage in the operation of the embodiment of FIG. 1;

FIG. 4 is a simplified view, in section, illustrating a third stage in the operation of the embodiment of FIG. 1;

FIG. 5 is a simplified view, in section, illustrating a fourth stage in the operation of the embodiment of FIG. 1;

FIG. 6 is a simplified view, in section, illustrating a fifth stage in the operation of the embodiment of FIG. 1;

FIG. 7 is a simplified view, in section, illustrating a sixth stage in the operation of the embodiment of FIG. 1;

FIG. 8a is a diagramatic view of a first stage of operation of the embodiment of FIG. 1 corresponding respectively to the structural views shown in FIG. 2, showing the center of crank rotation, the crankpin center, the center of connector rotation and the connector center of mass for zero degrees;

FIG. 8b is a diagramatic view of a second stage of operation of the embodiment of FIG. 1 corresponding respectively to the structural views shown in FIG. 3, showing the center of crank rotation, the crankpin center, the center of connector rotation and the connector center of mass for 30 degrees ;

FIG. 8c is a diagramatic view of a third stage of operation of the embodiment of FIG. 1 corresponding respectively to the structural views shown in FIG. 4, showing the center of crank rotation, the crankpin center, the center of connector rotation and the connector center of mass for 60 degrees;

FIG. 8d is a diagramatic view of a fourth stage of operation of the embodiment of FIG. 1 corresponding respectively to the structural views shown in FIG. 5, showing the center of crank rotation, the crankpin center, the center of connector rotation and the connector center of mass for 90 degrees ;

FIG. 8e is a diagramatic view of a fifth stage of operation of the embodiment of FIG. 1 corresponding respectively to the structural views shown in FIG. 6, showing the center of crank rotation, the crankpin center, the center of connector rotation and the connector center of mass for 180 degrees;

FIG. 8f is a diagramatic view of a sixth stage of operation of the embodiment of FIG. 1 corresponding respectively to the Structural views shown in FIG. 7, showing the center of crank rotation, the crankpin center, the center of connector rotation and the connector center of mass for 270 degrees;

FIG. 9 is a longitudinally-sectional elevational view of another embodiment of the invention;

FIG. 10 is a transverse sectional view of the embodiment of FIG. 9;

DETAILED DESCRIPTION

Figure 1:
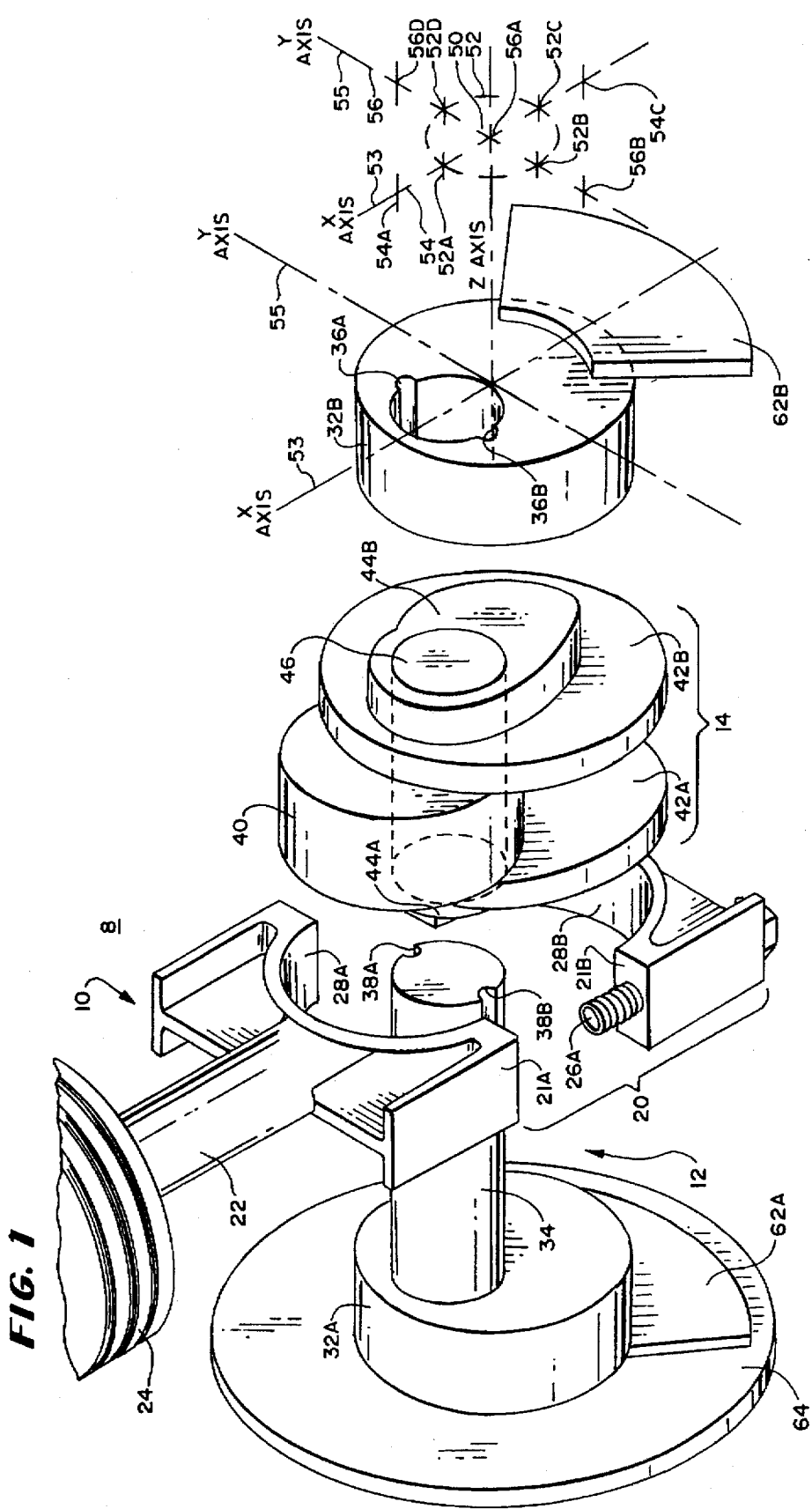
FIG. 1 is an exploded perspective view of an embodiment of the invention.

In FIG. 1 there is shown a partly exploded, fragmentary view of a machine 8 having a reciprocating member assembly 10, a crank assembly 12, and a connector 14. The crank assembly 12, as shown in FIG. 1, includes crank journals 32A and 32B, a crankpin 34 which is integral with crank journal 32A and fastened to crank journal 32B, crank counterweights 62A and 62B and flywheel 64. The reciprocating member assembly 10 includes rod connecting link 22, reciprocating piston portion 24 and the rod assembly 20. The rod assembly 20 includes portions 21A and 21B which are fastened together with bolts 26A and 26B (not shown) and bearing surfaces 28A and 28B on surfaces where rod assembly 20 receives cylindrical portion 40 connector 14.

To transfer force between and to control the reciprocating member assembly 10 and the crank assembly 12, the connector 14 includes a hole 46 with bearing surfaces that receive crankpin 34, a cylindrical portion 40 that is received my the hole in the rod assembly 20 of reciprocating member assembly 10, connector counterweights 42A and 42B and secondary interfaces 44A (not shown) and 44B. The connector 14 is thus rotatably mounted at hole 46 to the crankpin 34 and also rotatably attached at cylindrical portion 40 to the rod assembly 20 which in addition constrains the cylindrical portion 40 to reciprocating motion since the rod assembly 20 is confined to reciprocation by rod constraining surfaces (not shown in FIG. 1). With the secondary interfaces 44A and 44B, the primary mechanism is utilized to transfer the larger forces/lower velocities encountered by the reciprocating member to the crank and the intermittent secondary interfaces are utilized to transfer the smaller forces/higher velocities encountered by the reciprocating member to the crank.

The distance from the center (axis) of cylindrical portion 40 to the center (axis) of the hole 46 of the connector 14 that receives the crankpin 34 is equal to the distance from the center (axis) of the crank assembly 12 to the center (axis) of the crankpin 34, hereafter referred to as the crankpin offset or as the radius of crank rotation. The connector counterweights 42A and 42B are sized so that the resulting mass of the connector 14 is substantially the same as the mass of the reciprocating member assembly 10 and the center (axis) of the mass of the connector 14 is located at a distance equal to and in a direction opposite the center of the hole 46 receiving the crankpin 34 as is the center of the cylindrical portion 40.

With this construction, the connector 14 rotates around the crankpin 34 while the cylindrical portion 40 of the connector 14 rotates within the rod assembly 20 as its center reciprocates on the axis of reciprocation. The center of mass of connector 14 rotates around the crankpin 34 while it oscillates on an axis perpendicular to the axis on which the rod assembly 20 and the center of cylindrical portion 40 reciprocate.

The crank assembly 12 has counterweights that oppose the inertia force (inertia vector) of the reciprocating member assembly 10 along its axis of reciprocation and oppose the inertia force (inertia vector) of the connector 14 in the axis perpendicular to the axis of reciprocation. The translational inertia force (inertia vector) of the reciprocating member assembly 10 in the direction of reciprocation and also the translational inertia force (inertia vector) of the connector 14 in the direction perpendicular to the direction of reciprocation are ninety degrees out of phase and are opposed by crank counterweights 62A and 62B positioned on the crank assembly 12 opposite the crank pin 34.

The crank counterweights 62A and 62B oppose the inertia force (inertia vector) of the reciprocating member at the end of the stroke, the connector inertia force (inertia vector) at midstroke and the combined inertia forces (inertia vector) of the reciprocating member and the connector through the rest of the stroke.

The connector 14 incorporates intermittent secondary interfaces 44A and 44B to insure continuity of reciprocating member movement through the center of each stroke and incorporates counterweights 42A and 42B that cause the connector to have a size, mass and dimension that: (1) reduce and/or eliminate the transfer of energy back and forth from the crank to the reciprocating member throughout the stroke; (2) reduce and/or eliminate inertia forces on the secondary interface; (3) limit the forces encountered by the secondary interface to only the external forces encountered by the reciprocating member regardless of RPM; (4) minimize the need of a secondary interface for applications where the reciprocating member encounters external forces only at the ends of the stroke; (5) enable the combined inertia forces of the reciprocating member the connector and the crank to balance; (6) enable the machine to be fully balanced with just three moving parts: the crank assembly with crank counterweights, the reciprocating member and the connector with connector counterweights; (7) increase maximum fuel burn time per revolution for diesel engines; and (8) reduce stress on the crank in maintaining a reciprocating motion for the piston or pistons.

The relationship of the reciprocating member assembly 10 when it is at the top of the stroke with the axes in the Z direction), hereafter referred to as the centers, of crank 12, crankpin 34, and cylindrical portion 40 of connector 14 with respect to the connector 14 and crank assembly 12 is illustrated by the projection onto a plane having an X axis 53 (the axis of reciprocation for reciprocating member assembly 10, rod assembly 20, and the center of cylindrical portion 40) and a Y axis 55. The orientation of the X and Y axis in FIG. 1 has been rotated from conventional to be consistent with the XY orientation in FIGS. 2 and 8 which is conventional.

In this projection, the center of crank rotation is projected to point 50 and is hereafter referred to as crank center 50 or the center of crank rotation 50. The center of crankpin 34, hereafter referred to as crankpin center 52, revolves around the center of crank rotation 50 as projected on circle 52 where points 52A, 52B, 52C and 52D are the top of the stroke, midstroke where the reciprocating components are moving away from the top of the stroke, the bottom of the stroke and midstroke where the reciprocating components are moving towards the top of the stroke respectively.

The motion of the center of cylindrical portion 40 of the connector 14, hereafter referred to as the center of connector rotation 54, is projected as line 54 which is on X axis 53 and includes points 54A, 50, 54C and 50 which are again the top of the stroke, midstroke, the bottom of the stroke and midstroke respectively. The motion of the center of mass of connector 14, hereafter referred to as the connector center of mass 56, is projected as line 56 which is on Y axis 55. The motion of the connector center of mass 56 along Y axis 55 includes points 50 (or 56A), 56B, 50 and 56D which are again the top th stroke, midstroke the bottom of the stroke and midstroke. Both the center of connector rotation 54 and the connector center of mass 56 substantially pass through point 50 which is the intersection of X axis 53 and Y axis 55 and is the center of crank rotation 50. The center of connector rotation 54 and the connector center of mass 56 substantially coincides with the center of crank rotation 50 at midstroke and at the ends of the stroke respectively.

The reciprocating piston portion 24 may be a piston of any of the types used in an internal or external combustion engine, a pump or a compressor or it may be any other type of reciprocating member such as one that may be used in a stitching mechanism or an automated punch. Moreover while one piston is shown in FIG. 1, a plurality of pistons or other reciprocated members may be moved instead. They maybe mounted in different locations and ways to the rod or rods, such as, with one on each side of rod assembly 20 or only on one side and may be integral with the rod or separate from the rod. Generally, the piston portion, 24 is representative of any device or devices that requires back and forth motion and requires rotary motion mechanism to drive it or to be driven by it.

The rod assembly 20, the rod connecting link 22, and the reciprocating piston portion 24 may all be integrally formed so as to be of unit construction or be separate and fastened in a variety of ways. If integral, the rod assembly 20 may be shaped as a right angle parallolepiped with a diameter the same a the piston portion 24. The rod assembly 20 may have a different diameter or have rectangular sides.

The crank assembly 12 is constructed with crankpin 34 solid to crank journal 32A After the connector 14 is positioned on the crankpin 34, the crank journal 32B is assembled and fastened to the crankpin 34. The crankpin 34 and crank journal 32B have slots 38 A and B and 36A and B respectively that receive pins (not shown) to properly orient crank journal 32B with crank journal 32A. Any other suitable means may be used to fasten crank journal 32B to crankpin 34 and other common methods of crank construction and assembly including unit construction may be used provided they are coordinated with the construction of connector 14 and rod assembly 20 and can be assembled.

In the embodiment of FIG. 1, the connector 14 includes the cylindrical portion 40, the connector counterweights 42A and 42B adjacent to the cylindrical portion 40, and the connector side secondary interfaces 44A (not shown) and 44B adjacent to the connector counterweights 42A and 42B respectively. Various other connector constructions are possible including connector side secondary interfaces 44A and 44B being between the cylindrical portion 40 and the connector counterweights 42A and 42B. The connector side secondary interfaces could also be central with cylindrical portion 46 on both sides of the secondary interfaces 44A and 44B with counterweights 42A and 42B then adjacent to the two cylindrical portions. Another embodiment includes connector 14 without the connector side secondary interfaces 44A and 44B. This embodiment is representative of a machine without a secondary interface or with a secondary interface between the crank 12 and the rod assembly 20.

In still another embodiment, the crankpin 34 and the connector 14 are integral with the crankpin 34 being rotatably attached to crank journal 32A and 32B, in which case rotating inside the crank journals. The distance from the center of the crank journals 32A and 32B to the holes in the crank journals that receives crankpin 34 is still the crankpin offset and is equal to the distance from the center of crankpin 34 to the center of cylindrical portion 40 of the connector 14.

In FIGS. 2–7 here are shown, in a series of simplified, developed views, in section, the principal parts of the machine 8 including the reciprocating member assembly 10, the housing 16, the crankpin 34, the crank journals 32A and 32B (not shown) and the cylindrical portion 40 of connector 14 illustrating the operation of the embodiment of FIG. 1. The housing 16 includes rod assembly restraining surfaces 17 and 18 which confine rod assembly 20 (FIG. 1) of reciprocating member assembly 10 to reciprocating motion.

The rod constraining surfaces 17 and 18 in the housing 16 and corresponding surfaces on rod assembly 20 resist the side thrust forces that are encountered on rod assembly 20. In the preferred embodiment, these surfaces receive forced oil lubrication and should be significantly removed from the normal heat build up as found in combustion engines. If the rod constraining surfaces 17 and 18 are an extension of the cylinder wall then the fit between the piston and the cylinder walls would generally be slightly looser than the fit between rod assembly 20 and rod constraining surfaces 17 and 18 to allow for thermal expansion. However, this would be minimized with ceramics or thermal barrier coats.

The projection of the center of crank rotation, the crankpin center, the center of the cylindrical portion and the center of mass from FIG. 1 are further illustrated in FIGS. 2–7 and in FIGS. 8a–8f FIG. 2 illustrates motion converting mechanism 8 at the top of the stroke with center 52A of crankpin 34 and the center of connector rotation 54A of cylindrical portion 40 located on the positive side of the X axis as in FIG. 1. At the top of the stroke, the connector center of mass 56A of connector 14 coincides with the center of crank rotation 50.

For convenience, the top of the stroke is defined as 0 degrees where crankpin center 52A of crankpin 34 and the center of connector rotation 54A of cylindrical portion 40 of connector 14 are both located on the X axis 53 on its positive side. FIGS. 3–7 and 8a–8f illustrate motion converting mechanism 8 for 30 degrees, 60 degrees, 90 degrees, 180 degrees and 270 degrees respectively. FIGS. 8a–8f illustrate the centers only from FIGS. 2–7 by showing the center of crank rotation, the crankpin center, the center of connector rotation and the connector center of mass for 0 degrees, 30 degrees 60 degrees, 90 degrees, 180 degrees and 270 degrees.

In FIGS. 1 and 2, at the top of the stroke, the center of crank rotation 50 of crank assembly 12, the crankpin center 52A of crankpin 34 and the center of connector rotation 54A of cylindrical portion 40 of connector 14 are all substantially on the axis of reciprocation (X axis) 53. At the top of the stroke, the connector center of mass 56A of connector 14 substantially coincides with the center of crank rotation 50.

In FIG. 5 at midstroke, the center of crank rotation, 50 the crankpin center 52B and the connector center of mass 56B are substantially on line 55 (Y axis) which is perpendicular to the axis of reciprocation 53 and intersecting it at the center of crank rotation 50. At midstroke, the center of connector rotation 54B and the center of crank rotation 50 substantially coincide. Note that the crankpin center, the center of connector rotation and the connector center of mass will be referred to as 52, 54 and 56 respectively unless a specific angle is referenced such as 0 degrees at the top of the stroke where they are referred to as 52A, 54A and 56A respectively.

Because the crank center (center of crank rotation) 50 and the center of connector rotation 54 coincide at midstroke, the distance from the crankpin center 52 to the center of connector rotation 54 is equal to the distance from crank center 50 to crankpin center 52 and thus equal to the crankpin offset. It also follows that the distance from crank center 50 to the center of connector rotation 54 at the top of the stroke is equal to the distance from the crank center 50 to crankpin center 52 plus the distance from crankpin center 52 to the center of connector rotation 54 or twice the crankpin offset. The stroke is thus substantially four times the crankpin offset.

The basic structure and operation of the primary mechanism (crank, crankpin, connector, rod assembly and housing walls) of the machine is similar to that described in U.S. Pat. No. 4,658,768. The basic structure and operation of the secondary interface between the crank and the rod assembly or between the connector and the housing is similar to that described in U.S. Pat. No. 4,658,768 and U.S. Pat. No. 4,932,373 respectively. Further description of the parts of the basic machine with a stroke four times the crankpin offset including the primary mechanism and the secondary interfaces between the crank and the rod assembly and between the connector and the housing are provided in these patents with reference to similar drawings and technology.

Since the crank center 50 and the connector center of mass 56 coincide at the top and the bottom of the stroke, it follows that the distance from crankpin center 52 to the connector center of mass 56 is equal to the distance from crank center 50 to crankpin center 52 and thus equal to the crankpin offset. It also follows that the distance from the crank center 50 to the connector center mass 56 a midstroke is equal to the distance from crank center 50 to crankpin center 52 plus the distance from crankpin center 52 to the connector center mass 56 or twice the distance from crank center 50 to crankpin center 52 or twice the crankpin offset. The movement of the connector center of mass 56 is thus substantially four time the crankpin offset perpendicular to the direction of rod assembly reciprocation.

The motion of crankpin center 52 can be broken down into a component motion in the X axis or the direction of rod assembly reciprocation and a component of motion in the Y axis or in the direction perpendicular to the axis of reciprocation. The center of connector rotation 54 is confined to motion along the axis of reciprocation 53. Also, as best seen in FIGS. 8a and 8b at 30 degrees and at 60 degrees, the angle between the line connecting crank center 50 to crankpin 52 and the line connecting the center of connector rotation 54 and crankpin center 52 is equal to substantially twice the angle between the line connecting crankpin center 52 to crank center 50 and the line which is perpendicular to the axis of reciprocation 53 and which passes through crank center 50.

Because of this relationship, as the crankpin center 52 rotates counterclockwise, the center of connector rotation 54 reciprocates on the axis of reciprocation 53 while rotating clockwise relative to crankpin center 52. If crankpin center 52 rotates in the clockwise direction, the center of connector rotation 54 reciprocates on the axis of reciprocation 53 while rotating counterclockwise relative to crankpin center 52. The angular velocity of the connector 14 is equal and opposite the angular velocity of crank assembly 12. The center of connector rotation 54 has an angular velocity relative to crankpin 34 that is opposite and twice that of the angular velocity of crankpin 34 relative to crank center 50. Also, the motion and velocity of the center of connector rotation 54 is substantially twice the component of motion and velocity of crankpin center 52 in a direction of rod assembly reciprocation.

The movement and velocity of the center of connector rotation 54 is twice that of the crankpin center 52 in the direction of reciprocation. This relationship is very exacting at the top of the stroke and the bottom the stroke especially when the crankpin is approaching the axis of reciprocation 53. However, as the crankpin center 52 approaches midstroke, the relationship for the primary mechanism without a secondary interface becomes less defined.

As crankpin center 52 approaches midstroke, the angle between the axis of reciprocation 53 and the line connecting crank center 50 and crankpin center 52 approaches 90 degrees and the sine of that angle approaches 1. Since the distance from crankpin center 52 to the center of connector rotation 54 is equal to the distance from crank center 50 to the crankpin center 52, the sine of the angle between the axis of reciprocation 53 and the line connecting crankpin center 52 to the center of connector rotation 54 approaches 1. However, the sines of angles between 88 degrees and 92 degrees range from 0.9994 to 1 and are thus approaching 1. Meanwhile the cosines of the same angles are changing significantly.

Because of this relationship where the change in the sine of the angle is very small compared to the change in the cosine of the angle, the center of connector rotation 54 several could easily be several degrees or even more ahead of or behind the crankpin center 52 at midstroke. Further, since the set of angles with sines essentially approaching 1 include angles from about 85 degrees to 95 degrees, the center of connector rotation 54 could run substantially ahead or behind its theoretical position relative to the crankpin center 52 especially if reciprocating member assembly 10 is subjected to large forces that are in the direction of reciprocation through that portion of midstroke.

In addition, a second degree of freedom exists at exact midstroke when the center of connector rotation 54 coincides with the crank center 50. At exact midstroke, it is possible for crank assembly 12 and connector 14 to rotate with the same angular velocity in the same direction resulting in zero reciprocation motion and velocity for the center of connector rotation 54 and reciprocating member assembly 10.

A secondary interface to augment the primary mechanism (crank, crankpin, connector, rod assembly and housing walls) can eliminate the second degree of freedom and the possibility of the reciprocating member running ahead or falling behind its theoretical position relative to the crank U.S. Pat. Nos. 4,658,768, 4,543,919 and 4,485,769 describe a secondary interface between the crank assembly and the rod assembly and U S. Pat. No. 4,932,373 describes a secondary interface between the connector and the housing walls the disclosures of which are incorporated herein by reference.

In FIGS. 9 and 10, a secondary interface between the connector and the housing walls is shown at midstroke where the connector side secondary interface portions 44C and 44D are engaged with housing side secondary interface portions 72A and 72B respectively. Also shown is housing side secondary interface portions 72C and 72D which connector side secondary interface portions 44C and 44D will engage in the opposite direction of reciprocation through midstroke.

Connector side secondary interface portions 44C and 44D, in FIGS. 9 and 10, are confined by housing side secondary interface portions 72A and 72B to a motion of zero movement and zero velocity in the direction of reciprocation at point on the connector side secondary interface that is of equal but opposite distance from the crankpin center 52 (FIG. 1) of crankpin 34 (FIG. 1) as is the center of connector rotation 54 (FIG. 1) of cylindrical portion 40 (FIG. 1) of the connector. This arrangement restricts the motion and velocity of the center of connector rotation 54 of cylindrical portion 40 to be twice that of the crankpin center 52 of crankpin 34 in the direction of reciprocation. This resulting motion and velocity is the same and coincides with the motion and velocity of the primary mechanism and thus eliminates the second degree of freedom at exact midstroke and prevents the reciprocating member from running ahead or behind the crank assembly through a predetermined portion of midstroke. This mechanism is described in detail in U.S. Pat. No. 4,932,373.

The secondary interface describe in detail in U.S. Pat. Nos. 4,658,768, 4,543,919 and 4,485,769 is an interface between the crank and the rod assembly. The surfaces of the interface on the crank relative to a point on a line extending from the crank center through the crankpin center and at a distance twice the crankpin offset from the center of the crank impart and restrict motion to surfaces on the rod assembly that is twice that of the crank in center in the direction of reciprocation. Some forms of these surfaces are cam, cam-follower and gearing. This interface also confines the motion and velocity of the rod assembly to twice that of the crankpin center in the direction of reciprocation through a predetermined portion of midstroke.

At low to moderate speeds, the reciprocating member will generally encounter large forces an low velocities at the top of the stroke and smaller forces and higher velocities through midstroke. This would be typical of an engine when the piston portion of the reciprocating member is at the top of the stroke compressing and burning gases. The forces that the reciprocating member encounters during compression and ignition are generally many times greater than those forces it encounters as it travels through midstroke. This is true for pumps and compressors as well as engines where the force encountered by the reciprocating mechanism increases rapidly as it approaches the top of the stroke for single acting pistons. It is, thus, practical to size the secondary interface to encounter considerable smaller loads than the primary member due to the nature of the relative size of the forces encountered through midstroke as compared to the ends of the stroke. This is described in detail in U.S. Pat. No. 4,932,373.

It is advantageous, as described for rotary to reciprocating mechanisms of low to moderate speeds, to design the primary mechanism to transfer the large forces encountered at the ends of the stroke and to design the secondary interface with only that bulk and strength necessary to transfer the smaller forces found through midstroke. However, as speeds increase and the effects of inertia forces (inertia vectors) become more prominent, the secondary interface encounters ever increasing loads. These forces will even exceed those on the primary interface at the higher RPMS. The design would generally dictate that the bulk or size of the secondary interface should increase which also increases the size, the cost and the complexity of such mechanisms.

However, a novel solution to inertia dictating increased sizing of the secondary interface is the addition of connector counterweights that are sized and located so as to eliminate and or to reduce loads on the secondary interface due to inertia forces (inertia vectors) thus freeing the interface to transfer from the reciprocating member to the crank assembly only those forces that are encountered by the reciprocating portion of the reciprocating member.

Hereinafter in this specification, inertia forces will be used in describing the resistance that moving components offer when their motion is being changed even though the term inertia vector better distinguishes the vector $-ma$ (m is mass and a is acceleration) from actual forces.

Connector counterweights 42A and 42B (FIG. 1) are a novel addition to connector 14 associated with engines and motion converting mechanisms with a stroke that is four times the crankpin offset. They eliminate an inherent weakness in the simplified design of the primary mechanism and the secondary interface where inertia forces increase and approach or exceed those forces associated with loads on the piston or the reciprocating portion of the reciprocating member.

As better described in U.S. Pat. Nos. 4,658,768 and 4,932,373, the primary interface is between the crank/crankpin, the connector, the rod assembly and the housing with the secondary interface being either between the crank and the rod assembly as described in U.S. Pat. No. 4,658,768 or between the connector and the housing as described in U.S. Pat. No. 4,932,373. U.S. Pat. No. 4,932,373 more specifically details that it is advantageous to design the primary interface strong enough to handle the large forces encountered at either end of the stroke while the secondary interface should be designed to handle the lower forces and higher velocities associated with midstroke or the center portion of the stroke. This is very applicable for low to medium speed mechanisms but must be modified for high to very high speed engines and motion convering mechanisms.

As inertia forces increase and start to approach load forces on the reciprocating portion 24 of the reciprocating member assembly 10, then the necessary size of the secondary interface must increase to handle the inertia forces that are now approaching the size of the larger load forces.

One method to handle increased inertia forces on the secondary interface resulting from higher RPMs is to increase the size of the secondary interface until it approaches or exceeds the size of the primary interface. A novel solution is the addition of connector counterweights 42A and 42B, best shown in FIGS. 1–7 and 8a–8f that are of mass and location such that the resulting mass for connector 14 is substantially equal to the mass of reciprocating member assembly 10 and the connector center of mass 56 for connector 14 is located a distance of one crankpin offset in an equal and opposite direction from the center of hole 46 that receives crankpin 34 as is the center of connector rotation 54 of cylindrical portion 40. Thus connector 14 has a mass that is substantially equal to the mass of reciprocating member assembly 10 and connector 14 has a connector center of mass 56 that is substantially located a distance equal to the crankpin offset from crankpin center 52 and at a distance equal to twice the crankpin offset from the center of connector rotation 54 and is on the same line so that crankpin center 52 is centrally located between connector center of mass 56 and the center of connector rotation 54.

The negative effect of ever increasing inertia forces at higher RPM on the secondary interface can either be removed or reduced with the novel use of connector counterweights that remove or reduce the transfer of energy back and forth between the crank and the reciprocating member.

In FIG. 1 mechanism 8 is at the to of the stroke where connector 14 is shown with cylindrical portion 40, hole 46 that receives crankpin 34, connector counterweights 42A and 42B and the seconday interface portions 44A (not shown) and 44B. The center of connector rotation of cylindrical portion 40 is projected to point 54A, the crankpin center that coincides with the center of hole 46 is projected to point 52A, the resulting connector center o mass of connector 14 including the addition of special connector counterweights 42A and and 42B are projected to point 56A which coincides with point 50, and the crank center is projected to point 50.

All four centers are shown on the axis of reciprocation 53 for the top of the stroke. The orientation of the "X" axis 53 and the "Y" axis 55 in FIG. 1 is oriented to better coincide with the description and orientation used in FIGS. 2–7 and respective ones of FIGS. 8a–8f. The "X" axis is referred to as the axis of reciprocation in which reciprocating member assembly 10 is confined to travel and the crankpin center 52, the center of connector rotation 54 and the connector center of mass 56 are indicated by subscript letters A–F in FIGS. 2–7 and respective ones of FIGS. 8a–8f to show their position at various parts of the stroke.

Since the distance from the connector center of mass 56 is of equal distance but in opposite direction from the crankpin center 52 as is the center of connector rotation 54 and since the center of connector rotation 54 is confined to reciprocation on the axis of reciprocation 53, the connector center of mass 56 must oscillate along a line 56 which is a projection onto the "Y" axis 55 and is perpendicular to the axis of reciprocation 53. Further, since the center of connector rotation 54 is confined to reciprocation on the axis of reciprocation 53 with zero movement and velocity in the direction perpendicular and since the connector center of mass 56 is on a line extending from the center of connector rotation 54 through crankpin center 52 and at twice the distance from the center of connector rotation 54 as is crankpin center 52, the movement and velocity of the connector center of mass 56 in the direction perpendicular to the axis of reciprocation 53 must be twice that of the movement and velocity of crankpin center 52 in the direction perpendicular to the axis of reciprocation 53.

Since the center of connector rotation 54 is confined to a movement and velocity on the axis of reciprocation 53 that is twice that of crankpin center 52 in the axis of reciprocation 53 and since the distance from the connector center of mass 56 to the center of connector rotation 54 is twice that from the connector center of mass 56 to crankpin center 52, the resulting movement and velocity for the connector center of mass 56 in the axis of reciprocation 53 must be zero. Thus, the connector center of mass 56 oscillates perpendicular to the axis of reciprocation 53 with a travel of four times the crankpin offset and with a velocity that is twice the velocity of the crankpin center 52 in the direction perpendicular to the axis of reciprocation 53.

The movement and velocity of the connector center of mass 56 relative to crank center 50 is perpendicular to and of equal magnitude as the center of connector rotation 54 but 90 degrees out of phase. At the top and bottom of the stroke, the connector center of mass 56 will be at its maximum velocity while the center of connector rotation 54 is at its minimum. At midstroke, the connector center of mass 56 is at its minimum velocity while the center of connector rotation 54 is at its maximum.

Both the center of connector rotation 54 and the connector center of mass 56 oscillate perpendicular to each other through the ax's of crank rotation 50. This embodiment results in the connector center of mass 56 of connector 14 rotating around crankpin center 52 with an equal but opposite angular velocity as does crankpin center 52 around the crank center 50 while oscillating perpendicular to the axis of reciprocation 53 with a velocity that is equal but 90 degrees out of phase with the velocity of the center of connector rotation 54 and reciprocating member assembly 10.

In FIG. 2, at the top of the stroke, the connector center of rotation 54, crankpin center 52A, the connector center of mass 56A and crank center 50 are all shown of the same line which is the axis of reciprocation 53. The connector center of mass 56A also coincides with crank center 50 at the top of the stroke. The crank center 50 and the center of connector rotation 54 are always on the axis of reciprocation while crankpin center 52 and the connector center of mass 56 pass through the axis of reciprocation at the top of the stroke and the bottom of the stroke.

At the bottom of the stroke in FIG. 6, the connector center of rotation 54C, the crankpin center 52C, the connector center of mass 56C and crank center 50 again all fall on the axis of reciprocation with the connector center of mass 56C coinciding with the center of crank rotation 50. At the top of the stroke and the bottom of the stroke, the velocity of the crankpin center 52 has a component velocity of zero in the axis of reciprocation. The velocity of the center of connector rotation 54 is twice that of crankpin center 52 in the axis of reciprocation and is thus zero at the top of the stroke and at the bottom of the stroke.

Since the connector center of mass 56 is on a line twice the distance from the connector center of rotation 54 as is crankpin 52 and since the velocity of the center of connector rotation 54 is zero, the velocity of the connector center of mass 56 is twice that of crankpin center 52. The velocity of the connector center of mass 56 is thus twice that of the crankpin center 52 in a direction perpendicular it to the axis of reciprocation.

At midstroke in one direction of reciprocation as shown in FIG. 5, the center of connector rotation 54B, the crankpin center 52B and the connector center of mass 56B all fall on a line 55 ("Y" axis) that is perpendicular to the axis of reciprocation 53 and passing through the center of crank rotation 50 with the center of connector rotation 54B coinciding with crank center 50. At midstroke in the other direction of reciprocation as shown in FIG. 7, the center of connector rotation 54D, the crankpin center 52D and the connector center of mass 56D all fall on line 55 ("Y" axis) with the center of connector rotation 54D coinciding with crank center 50.

At midstroke in both directions of reciprocation, the velocity of the crankpin center 52 has a component velocity of zero in the direction perpendicular of the axis of reciprocation. Since the connector center of mass 56 is on a line twice the distance from the connector center of rotation 54 as is crankpin 52 and since the velocity of the center of connector rotation 54 in the direction of reciprocation is twice that of crankpin center 52 in the direction of reciprocation and since both have a velocity of zero in the direction perpendicular to the axis or reciprocation at midstroke, it follows that the velocity of the connector center of mass 56 is zero at midstroke.

From FIG. 2, FIG. 6, FIG. 5, and FIG. 7, it can be seen that the combined energy of connector 14 and reciprocating member assembly 10 at the top of the stroke, the bottom of the stroke and both directions of reciprocation at midstroke respectively remains constant. This follows from the mass of connector 14 and the mass of reciprocating member assembly 10 being equal and from the velocities of the center of connector rotation 54 and the connector center of mass 56 being zero and twice the velocity of the crankpin center 52 respectively at the ends of the stroke and twice the velocity of crankpin center 52 and zero respectively at midstroke.

The magnitude of the combined momentum of connector 14 and reciprocating member assembly 10 also remains unchanged from the top of the stroke, to midstroke, to the bottom of the stroke, to midstroke, and then back of the top of the stroke. The direction of the momentum at the ends of the stroke and midstroke is in the same direction of motion as is the crankpin center 52 since the mass of connector 14 and mass reciprocating member assembly 10 are equal and since at the ends of the stroke, the connector center of mass 56 has a velocity of twice that of crankpin center 52 while the reciprocating member assembly 10 has a zero velocity and at midstroke, the connector center of mass 56 has a zero velocity while the reciprocating member assembly 10 has,a velocity of twice that of the crankpin center 52. Thus, the magnitude of the combined momentum of connector 14 and reciprocating member assembly 10 remains unchanged with direction same as crankpin center 52.

The resulting momentum in equation form is show in equation 1, where P is momentum $M_r$ is the mass of reciprocating member assembly 10, $M_c$ is the mass of connector 14, $[V_{cp}]$ is the absolute velocity of the crankpin center 52, $(2[V_{cp}])*(-\sin Theta)$ is the velocity of reciprocation member assembly 10 which is the same as the connector center of rotation 54 and $(2[V_{cp}])*\cos Theta$ is the velocity of the connector center of mass 56. The equation can be reduced to the form shown in equation 2 or equation 3 in magnitude and of the same direction as crankpin center 52 Since $M_r=M_c$ and since $-\sin$ theta and cos theta are 0 and 1, $-1$ and 0, 0 and $-1$, and 1 and 0 for 0 degrees, 90 degrees, 180 degrees, and 270 degrees respectively where theta is referenced from the axis of reciprocation at the top of the stroke. Thus, $P=M_r*(2V_{cp})$ where P is the combined momentum of connector 14 and reciprocating member assembly 10, where the mass of reciprocating member 10 is equal to the mass of connector 14, and where $2V_{cp}$ is twice the directional velocity of crankpin center 52. Momentum is constant.

FIGS. 3 and 4 illustrate mechanism 8 for clarity at positions other than the ends of the stroke and midstroke. In FIG. 3, mechanism 8 is at 30 degrees from the top of the stroke. The crankpin center 52E has rotated 30 degrees from the top of the stroke. The connector center of rotation 54E is on the axis of reciprocation at a distance of cos 30 degrees times twice the crankpin offset or 1.732 times the crankpin offset from drank center 50 and has a velocity along the axis of reciprocation of magnitude of sin 30 degrees times twice the velocity of crankpin center 52E or equal to 1.000 times the velocity of crankpin center 52E. The connector center of mass 56E is on a line through crank center 50 perpendicular to the axis of reciprocation at a distance of sin 30 degrees times twice the crankpin offset or 1.000 times the crankpin offset from crank center 50 and has a velocity along a line through crank center 50 perpendicular to the axis of reciprocation of magnitude of cos 30 degrees times twice the velocity of crankpin center 52E or of a magnitude equal to 1.732 times the velocity of crankpin center 52E.

In FIG. 4, mechanism 8 is at 60 degrees from the top of the stroke. The crankpin center 52F has rotated 60 degrees from the top of the stroke. The connector center of rotation 54F is on the axis of reciprocation at a distance of cos 60 degrees times twice the crankpin offset or 1.000 times the crankpin offset from crank center 50 and has a velocity along the axis of reciprocation of magnitude of sin 60 degrees times twice the velocity of the crankpin center 52F or of a magnitude equal to 1.732 times the velocity of crankpin center 52F. The connector center of mass 56F is on a line through crank center 50 perpendicular to the axis of reciprocation at a distance of sin 60 degrees times twice the crankpin offset or 1.732 times the crankpin offset from crank center 50 and has a velocity along a line through crank center 50 perpendicular of the axis of reciprocation of magnitude of cos 60 degrees times twice the velocity Equation 1

$$P=M_r*(2[V_{cp}])*(-\sin Theta)+M_c*(2[V_{cp}])*\cos Theta$$

Equation 2

$$P=M_r*(2[V_{cp}])*(-\sin Theta+\cos Theta)$$

Equation 3

$$P=M_r*(2[V_{cp}])$$

Equation 4

$$P=M_r*(2[V_{cp}])*(-\sin theta)+M_c*(2[V_{cp}])*\cos theta =M_r*(2[V_{cp}])*(-\sin theta+\cos theta)=M_r*(2V_{cp})$$

of the crankpin center 52F or of a magnitude equal to 1.000 times the velocity of crankpin center 52F.

The combined momentum of reciprocating member assembly 10 and connector 14 of FIGS. 3 and 4 and for other angles other than at the end of the stroke and mid stroke is still the mass of reciprocating member assembly 10 times twice the velocity of crankpin center 52 or in the form of equation 4, where P is momentum, $M_r$ is the mass f reciprocating member assembly 10, $M_c$ is the mass of connector 14 which is equal to $M_r$, $V_{cp}$ and $[V_{cp}]$ are the directional velocity and the absolute velocity respectively of the crankpin center 52, $(2[V_{cp}]*(-\sin\theta)$ is the velocity of reciprocating member assembly 10 in the axis of reciprocation which is also the same as the connector center of rotation 54, and $(2[V_{cp}])*\cos\theta$ is the velocity of the connector center of mass 56 in the direction perpendicular to the axis of reciprocation.

The quantity $(-\sin\theta+\cos\theta)$ preserves the direction of velocity on a cartesian coordinate system where the top of the stroke is defined as the positive X axis and theta=0 degrees. The absolute value of $(-\sin\theta+\cos\theta)$ is 1 as is demonstrated by the addition of velocities from FIG. 3 at 30 degrees from the top of the stroke for the center of connector rotation 54E and the connector center of mass 56E which are 1.000 and 1.732 times the velocity of the crankpin center 52E respectively. Their vector summation is $(1^2+1.732^2)^{0.5}=2$ or twice the magnitude of the velocity of crankpin center 52E.

Use of the directional value of $2*(-\sin\theta+\cos\theta)$ yields directional values of −1.00 along the axis of reciprocation (X axis) and 1.732 along the line through crank center 50 perpendicular to the axis of reciprocation (Y axis) which is a vector of magnitude that is again twice that of the velocity of crankpin center 52E and in a direction the same as crankpin center 52E which is 30 degrees from the top of the stroke. The combined directional velocities as well as the combined absolute velocities of the center of connector rotation 54 and the connector center of mass 56 are twice that of the velocity of crankpin center 52 as demonstrated for FIG. 3. This can similarly be demonstrated for FIG. 4 where the crankpin center 52F is 60 degrees from the top of the stroke and can similarly be demonstrated for any other crankpin angle. Since the masses of the reciprocating. member assembly 10 and the connector 14 are equal, their combined directional momentum is the mass of the reciprocating member assembly 10 times twice the directional velocity of crankpin center 52.

The combined energy of reciprocating member assembly 10 and connector 14 remains unchanged throughout the stroke unless there is a change in RPM due to an external force on crank assembly 12 or due to an external force on reciprocating member assembly 10 or due to frictional forces. This is best demonstrated by the combined energy of connector 14 and reciprocating member assembly 10 as shown at the top of the stroke in FIG. 2, at midstroke in FIG. 5, at the bottom of the stroke in FIG. 6, and at midstroke in the opposite direction in FIG. 7.

The combined energy at the top of the stroke is half the mass of connector 14 times the square of the velocity of the connector center of mass 56A where the velocity of the connector center of mass 56A is twice that of the velocity of crankpin center 52A. The energy of the reciprocating member assembly 10 is zero since its velocity is zero. Thus, the combined energy at the top of the stroke is twice the mass of connector 14 times the square of the velocity of crankpin 52A. The combined energy at the bottom of the stroke is the same.

The combined energy at midstroke is half the mass of reciprocating mechanism 10 times the square of the velocity of the reciprocating mechanism 10 which is the same velocity as the center of connector rotation 54B where the velocity of the center of connector rotation 54B is twice that of the velocity of crankpin 52B. The energy of connector center mass 56B is zero since its velocity is zero. Thus, the combined energy at midstroke is twice the mass of reciprocating member assembly 10 times the square of the velocity for crankpin center 52B. The combined energy at midstroke in the opposite direction of reciprocation is also the same.

Since the mass of connector 14 and the mass of reciprocating member assembly 10 are the same and since the velocity of crankpin center 52 remains constant for positions 52A in FIG. 2, 52B in FIG. 5, 52C in FIG. 6, and 52D in FIG. 7, the combined energy of connector 14 and reciprocating member assembly 10 remains constant, being equal to twice the mass of reciprocating member assembly 10 times the square of the velocity of crankpin center 52 for the top of the stroke, midstroke, the bottom of the stroke, and midstroke in the opposite direction.

The combined energy of connector 14 and reciprocating member assembly 10 remains constant throughout the entire stroke not just at the ends of the stroke and midstroke. This is best shown in equation 5, where E is energy M is mass, V is velocity, $M_r$ is the mass of reciprocating member assembly 10, $V_r$ is the velocity of reciprocating member assembly 10, $M_c$ is the mass of connector 14, $V_c$ is the velocity of connector center of mass 56, $[V_{cp}]$ is the non directional magnitude of the velocity of crankpin center 52, $(2[V_{cp}])*(-\sin\theta)$ is the velocity of reciprocating member assembly 10, and $(2[V_{cp}]*\cos\theta$ is the velocity of the connector center of mass 56.

Since $(-\sin\theta)^2+(\cos\theta)^2=1$ and since th mass of connector 14 ($M_c$) is equal to the mass of reciprocating member assembly 10 ($M_r$), equation 5 can be further simplified to equation 6. This can be further demonstrated in FIG. 3 where the magnitude of the velocity of the center of connector rotation 54E is twice that of the crankpin center 52E in the axis or reciprocation which is $(-\sin 30°)*2V_{cp}=-V_{cp}$ and the velocity of the connector center of mass 56E is twice the crankpin center 52E in the direction perpendicular to the axis of reciprocation which is $(\cos 30°)*2V_{cp}=1.732 V_{cp}$. The combined energy of reciprocating member assembly 10 and connector 14 is as shown in equation 7, where $M_c=M_r$. Similarly in FIG. 4, the magnitudes of the velocities of the center of connector rotation 54F and the connector center of mass 56F are $(-\sin 60°)2*V_{cp}=-1.732V_{cp}$ and $(\cos 60°)*2V_{cp}-V_{cp}$ respectively. The combined energy of reciprocating member assembly 10 and connector 14 is as shown in equation 8, where $M_c=M_r$.

Thus, unlike other rotary to reciprocating mechanisms, there is no constant transfer of kinetic energy back and forth throughout the stroke between the crank and the reciprocating member since the combined energy of connector 14 and the reciprocating member assembly 10 remains constant. The transfer of energy between crank assembly 12 and reciprocating member assembly 10 occurs only when there are external forces on crank assembly 12, external forces on reciprocating member assembly 10 such as during compression and combustion and/or frictional forces. Since there is no transfer energy back and forth between crank assembly 12 and reciprocating member assembly 10 to accelerate and decelerate reciprocating member assembly 10, the forces encountered by the secondary intersurface are independent of the RPM of mechanism 8.

As described, the reciprocating member including the connecting link and the reciprocating portion of the mechanism whether a pump, a compressor, an engine, or some other reciprocating member have zero velocity, zero momentum, and zero energy at the bottom of the stroke and at the top of the stroke. Also, the connector has zero translational velocity, zero translational momentum, and zero translational energy at midstroke in both directions of reciprocation. The connector's rotational velocity, momentum, and energy remains constant unless external forces change the RPM. As a result, there is no transfer of energy between the crank, and the reciprocating member from one end of the stroke to the other end of the stroke unless the combined kinetic energy of the crank, connector, and the reciprocating member is affected by an external force.

Equation 5

$$E=1/2MV^2=1/2M_rV_r2+1/2M_cV_c2=1/2M_r*[(2[V_{cp}])*(-\sin\text{ theta})]^2+1/2M_c*[(2[V_{cp}])*\cos\text{ theta}]^2$$

Equation 6

$$E=1/2M_r*(2[V_{cp}])^2*[(-\sin\text{ theta})^2+(\cos\text{ theta})^2]=2M_r*V_{cp}^2*(1)=2M_r*V_{cp}^2.$$

Equation 7

$$E=1/2M_r*(-V_{cp})^2+1/2M_c*(1.732V_{cp})^2=2M_r*V_{cp}^2$$

Equation 8

$$E=1/2M_r*(-1.732V_{cp})^2+1/2M_c*(V_{cp})^2 2M_r*V_{cp}^2$$

In terms of energy, the reciprocating member assembly 10 has maximum velocity and energy at midstroke and zero energy at the top and the bottom of its stroke where its velocity is zero as it switches directions. Without novel connector counterweights 42A and 42B and during no load conditions from external forces, reciprocating member assembly 10 receives kinetic energy from crank assembly 12 from the top of the stroke to midstroke and from the bottom of the stroke to midstroke and returns the kinetic energy to the crank assembly from midstroke to the top of the stroke and from midstroke to the bottom of the stroke.

Although the primary interface transfers the energy at the top and the bottom of the stroke, the secondary interface encounters the forces necessary to transfer the energy through midstroke. Energy transferred back and forth from crank assembly 12 to reciprocating member assembly 10 will decrease as the mass of the connector counterweights 42A and 42B increase on the side opposite hole 46 than is connector cylindrical portion 40. The energy transfer between crank assembly 12 and reciprocating member assembly 10 will approach zero as the mass and location of connector counterweights 42A and 42B is such that the mass of connector 14 approaches the mass of reciprocating member assembly 10 and the connector center of mass 56 approaches a distance equal and opposite from the hole 46 receiving crankpin 34 as is the center of connector rotation 54 of cylindrical portion 40 of connector 14.

The use of connector counterweights 42A and 42B as further described in FIGS. 11a–11d and FIGS. 12a–12d is inclusive of the specific subset described in FIGS. 1–7 and corresponding ones of FIGS. 8a–8f. In FIGS. 11a–11d, and FIGS. 12a–12d connector counterweights 42A and 42B are of mass and location such that the resulting mass of connector 14 is substantially equal to the mass of reciprocating member 10 times the distance of the center of connector rotation 54 to the center of hole 46 divided by distance of the connector center of mass 56 to the center of hole 46 where hole 46 which receives crankpin 34 is located on a line connecting the center of connector rotation 54 and the connector center of mass 56. Thus the product of the mass of connector 14 times the distance from its center of mass 56 to crankpin center 52 is substantially equal to the product of the mass of reciprocating member 10 times the distance of the center of connector rotation 54 to crankpin center 52 where the center of connector rotation 54 and the connector center of mass 56 are in opposite directions from crankpin center 52.

The proper addition of counterweights 42A and 42B allows the secondary interface to be sized to handle loads encountered by reciprocating portion 24 in doing work or by work done on it regardless of RPMs and the resulting inertia forces. This decreases the necessary size of secondary interfaces for higher speed applications for both types of secondary interfaces, those between the connector and the housing and those between the crank and the rod assembly. A secondary interface may be nominal or not even be necessary for those applications where there is a load only on the ends of the stroke with none a midstroke.

The crank assembly 12 in FIG. 1 includes flywheel 64 and crank counterweights 62A and 62B. The flywheel 64 is not required to supply energy to accelerate and decelerate the reciprocating member 10 since the novel connector design incorporating connector counterweights 42A and 42B does this. However, the flywheel 64 should be sized to reduce fluctuations in crank velocity due to work done by or on reciprocating portion 24 of reciprocating member 10.

The crank counterweights 62A and 62B are sized to oppose the translational inertia forces of reciprocating member 10 in the axis of reciprocation and the translational inertia forces of connector 14 in the axis perpendicular to the axis of reciprocation. The crank counterweights 62A and 62B can cancel out the combined translational inertia forces of reciprocating member 10 and novel connector 14 as described since these forces are equal but 90 degrees out of phase.

FIGS. 8a–8f shows crank center 50, crankpin center 52, the center of connector rotation 54, and the connector center of mass 56 for 0 degrees, 30 degrees, 60 degrees, 90 degrees, 180 degrees and 270 degrees. From FIGS. 8a–8f, it can be understood that crankpin center 52A–F is central to the connector center of mass 56A–F and the center of connector rotation 54A–F which are respectively the center of mass of connector 14 and the central location that the mass of reciprocating member 10 acts upon.

Mechanism 8 can be fully balanced by the addition of crank counterweights 62A and 62B that are opposite crankpin center 52 on a line through crankpin center 52 and crank center 50 and that are sized to oppose the momentums of reciprocating member 10 and connector 14 whose momentums are perpendicular and 90 degrees out of phase with each other and when combined act centrally on crankpin center 52 with constant momentum that is twice the mass of the reciprocating member 10 times the directional velocity of crankpin center 52.

As described earlier, the combined momentum of reciprocating member 10 and connector 14 through the entire stroke is the mass of reciprocating member 10 times twice the velocity of crankpin center 52 or in the form of equation 9 where P is momentum, $M_r$ is the mass of reciprocating member 10, $M_c$ is the mass of connector 14 which is equal to $M_r$, $V_{cp}$ and $[V_{cp}]$ are the directional velocity and the absolute velocity respectively of the crankpin center 52, $(2[V_{cp}])*(-\sin\text{ theta})$ is the velocity of reciprocating member 10 which is the same as the center of connector rotation 54, and $(2[V_{cp}])*\cos\text{ theta}$ is the velocity of the connector center of mass 56.

Mechanism 8 can be fully balanced by the addition of crank counterweights 62A and 62B to Equation 9

$$P = M_r*(2[V_{cp}])*(-\sin\theta) + M_c*(2[V_{cp}])*\cos\theta = M_r*(2[Vcp])*(-\sin\theta+\cos\theta) = M_r*(2V_{cp})$$

Equation 10

$$P_{cc} = M_{cc}*V_{cc} = -M_r*(2V_{cp}) = -P$$

crank assembly 12 that have the same absolute momentum as the combined translational momentum of reciprocating member 10 and connector 14 and that have an orientation opposite the crank center 50 as is the crankpin center 52. The crank counterweights 62A and 62B have momentums shown in equation 10 where $P_{cc}$ is the momentum, $M_{cc}$ is the mass, and $V_{cc}$ is the velocity of the crank counterweights 62A and 62B.

The inertia forces of crank counterweights 62A and 62B are thus outward from crank center 50 in a direction opposite crankpin center 52 and are of equal magnitude of the combined translational inertia forces of reciprocating member 10 and connector 14. The outward (centrifugal) inertia forces of crank counterweights 62A and 62B thus oppose the translational inertia forces of reciprocating member 10 at the top a and the bottom of the stroke, the translational inertia forces of connector 14 at midstroke in both directions, and the combined translational inertia forces of reciprocating member 10 and connector 14 between midstroke and the end of the strokes. Crank counterweights 62A and 62B are sized to also balance the outward (centrifugal) inertia force of crankpin 34.

FIG. 9 is a longitudinally-sectioned, elevational view of an engine 8A and FIG. 10 is a simplified plan view, in section of engine 8A with reciprocating member 10A that includes rod assembly 20A, a double-acting piston 24A, and a rod connecting link 22A between the two. The rod assembly 20A is confined to reciprocation by rod constraining surfaces 17A and 18A in housing 16A. Crankpin 34A is rotating counterclockwise through midstroke while connector 14A is rotating clockwise around crankpin 34A. Cylindrical portion 40A of connector 14A is confined to reciprocation by rod assembly 20A which in turn is confined to reciprocation by surfaces 17A and 18A. Rod assembly 20A includes rod assembly portions 21C and 21D which house cylindrical portion 40A of connector 14A and are assembled together with bolts 26C and 26D. The connector 14A includes connector side secondary interfaces 44C and 44D, which engage housing side secondary interfaces 72A and 72B in one direction through midstroke and 72C and 72D in the opposite direction through midstroke. The connector 14A also includes connector counterweights 42C and 42D.

The crank assembly 12A includes crankpin 34A and crank portions 32C and 32D where crankpin 34A is solid to crank portion 32C and crank portion 32D is assembled to crankpin 34A after connector 14A is slid into position. Various other methods of construction are possible such as assembling connector 14A onto crankpin 34A of a unit construction crank 12A rather than sliding connector 14A onto crank pin 34A.

The crank assembly 12A which is rotating counterclockwise also includes flywheel 64A and crank counterweights 62C and 62D. The crankpin 34A receives oil from the main bearings as is typical of most engines. An oil line 101 or multiple oil lines 101 provide(s) oil to the surfaces of crankpin 34A for lubrication between bearing surfaces of crankpin 34A and connector 14A and provides oil to oil lines 100 in cylindrical portion 40A of connector 14A.

The connector 14A is assembled onto crankpin 34A and cylindrical portion 40A is housed in the rod assembly 20A. The connector 14A is shown at midstroke with connector side secondary interfaces 44c and 44D engaging housing side secondary interfaces 72A and 72B in one direction of midstroke. The connector 14A is rotating clockwise at an equal and opposite angular velocity as is crank assembly 12A. The connector counterweights 42C and 42D are shown at one end of their movement which occurs at midstroke with their inertia forces equal and opposite those of crank counterweights 62C and 62D. In the opposite direction of midstroke, 180 degrees later, the connector counterweights 42C and 42D will be at the other end of their movement with their inertia forces again equal and opposite those of crank counterweights 62C and 62D.

At the end of the strokes, the crank counterweights 62C and 62D will oppose the inertia forces of the reciprocating member 10A. Oil lines 100 in cylindrical portion 40A provide oil to lubricate the bearing surfaces between cylindrical portion 40A and rod assembly 20A and also channels oil to oil line 102 in reciprocating member 10A. This oil can also be channeled to provide lubrication to the secondary interface.

The reciprocating member 10A is shown with piston 24A, rod connecting link 22A, and rod assembly portion 21C as a unit construction with bolts 26C and 26D fastening rod assembly portion 21D to portion 21C to house cylindrical portion 40A of connector 14A. The reciprocating member 10A may be constructed in various manners such as piston 24A being assembled to rod connecting link 22A which is assembled to or solid to rod assembly portion 21C. The piston 24A is shown as a double acting piston with piston/oil rings 90 on both ends of piston 24A. The oil line 102 provides cooling to rod connecting link 22A and piston 24A. One passage in oil line 102 would provide oil to piston 24A and the other passage would return oil to rod assembly portion 21C. Oil line 102 receives oil from oil lines 100 in cylindrical portion 40A of connector 14A which receives oil from oil lines 101 in crankpin 34A. The piston 24A may also be constructed from ceramic materials and may require minimal or no cooling.

The upper portion of engine 8A includes upper head 94A, cylinder block 94B, and lower head 94C which include water lines 80 for cooling diesel fuel injectors 86, exhaust ports 84 and intake ports 82A and 82B. Bolts 92 pass through upper head 94A, cylinder block 94B, and lower head 94C and are threaded into housing 16A and 16B. Various other methods of construction may be practiced including combining block 94B with either head 94A or 94C. Water lines 80 are conventional. Cooling fins could also be used. Fuel injectors 86 are conventional, however they could also be designed so their timing could easily be advanced especially for two cycle diesel engines where fuel burn time and scavenging are negatively affected by increased RPM. One such method would be solenoid activated injectors that are microprocessor controlled. Lower block 94C includes piston rings 88 to isolate combustion chamber 108 from the crank connector and rod assembly. Vent 89 between the rings helps minimize combustion particles entering the housing.

Intake ports 82A and 82B supply air to both combustion chambers 106 and 108. Not shown is a blower or supercharger that could be any conventional blower or compressor inclusive of roots blowers and screw, gear, and vane compressors that provides positive air pressure to intake ports 82A and 82B. Exhaust ports 84 exhausts gases from combustion chambers 106 and 108. The piston 24A uncovers exhaust ports 84 and intake ports 82A and 82B to combustion chamber 108 at the top of the stroke as combustion chamber 106 completes compression and commences ignition and uncovers combustion chamber 106 at the bottom of the stroke as combustion chamber 108 completes compression and commences ignition.

The length of piston 24A is of a length substantially that of the length of the stroke less the length of the exhaust ports. The flow of gases out of exhaust ports 84 and the flow of air in through ports 82A and 82B is similar to conventional two cycle engines except exhaust ports 84 and intake ports 82A and 82B serve to remove gases and supply air to two combustion chambers instead of one. However, piston 24A could be built sufficiently longer than the stroke so that separate intake ports and separate exhaust ports would communicate with combustion chambers 106 and 108. The centers of intake ports 82A and 82B are located between 90 degrees and 120 degrees from the center of exhaust ports 8 and are angled to supply air in a direction toward the tops of the combustion chambers and to the side opposite exhaust ports 84. The air from intake ports 82A and 82B moves towards the top of the chamber, over, and back toward exhaust ports 84 as gases continue to escape through exhaust ports. 84. The intake port 82A favors flow into combustion chamber 106 while intake port 82B favors flow into combustion chamber 108. Both intake ports supply air to each combustion chamber, however, intake ports 82A and 82B supply different amounts of air to different parts of the combustion chamber since their upward angles are different. This also encourages swirl resulting in better mixing of fuel during injection.

Although one specific method of port construction was described, other more conventional methods of port construction or valves may be used. Intake ports and exhaust ports could be 180 degrees apart. Intake ports and exhaust valves or vice versa may also be incorporated The construction could also be changed to a four cycle design using only valves. However this would reduce the number of power strokes to one per revolution unless a second piston is added. A second double acting piston could be added to the same rod connecting link or a second rod connecting link could be attached of the rod assembly opposite the first with a second double acting piston to achieve two strokes per revolution for a four cycle engine. Two strokes per revolution could also be achieved with a two cycle engine with two single acting pistons that are either located on one rod connecting link or on opposed rod connecting links.

Engine 8A in FIGS. 9 and 10 is shown as a two cycle diesel with one double acting piston 24A resulting in two power strokes per revolution. In the preferred embodiment, it is desirable for piston 24A and cylinder walls 9A–C to be made from materials such as ceramics to allow the engine to operate at higher temperatures. Thick thermal barrier coats on metal may also be used to achieve higher engine temperatures. These materials are fundamental to the development of higher efficiency low heat rejection diesel engines. Higher cylinder temperatures are also desirable to decrease fuel burn time and thus improve the efficiency of the diesel cycle at higher RPMs and/or to increase the engine horsepower to weight ratio. Higher temperature materials are desirable to better utilize the novel connector counterweights 42C and 42D which eliminate the effect of inertia forces on the secondary interface and permit higher possible engine RPMs.

Advanced materials involving cutting edge technologies can be more easily incorporated into the design of engine 8A and utilized than conventional engines for several reasons. First, there are no side thrust forces from piston 24A on cylinder walls 94B. Second, the combustion portion of the engine is removed significantly from the rotary to reciprocating mechanism portion as compared to those engines utilizing connecting rods. Third, the application of higher temperature materials can be more economically incorporated since only one piston and one cylinder are required for engine 8A which produces two power strokes per revolution, which is equivalent to a four cylinder, four cycle engine with single acting pistons. Fourth, the benefits of higher temperature and low thermal conductive materials are greater for double acting pistons than single acting pistons since double acting pistons cannot remove heat build up as easily.

FIGS. 9 and 10 described one specific method of engine construction using a connector resulting in a stroke that is four times the crankpin offset where the connector has novel connector counterweights that eliminate the transfer of energy back and forth from the crank to the reciprocating member and allows engine 8A to achieve high RPMs without increasing the size of the secondary interface. However, the construction an be varied from construction of components to methods of assembly. The construction may be varied to be inclusive of a secondary interface between the housing and the connector, or a secondary interface between the crank and the rod assembly, or no secondary interface. Also, the specific application described is not limited 60 diesel engines. The use of connector counterweights is very applicable to gasoline engines since even though the weight for comparative reciprocating parts are usually less, they generally turn higher RPMs. The use of connector counterweights is also very applicable to external combustion engines, pumps, and compressors especially at higher RPMs.

The application of a connector resulting in a stroke four times the crankpin offset and with connector counterweights to eliminate that transfer of energy back and forth between the crank and the reciprocating member is also very applicable to any rotary to reciprocating mechanism especially those that operate at high RPM and with large inertia forces. The use of connector counterweights is similarly effective for applications using a secondary interface between the crank and the rod assembly and not limited to just those applications with the secondary interface between the connector and the housing. Also, the use of connector counterweights can reduce the necessary size, and in some cases eliminate the need of a secondary interface for those applications where there are loads only at the ends of the strokes. This would not be possible for high RPM applications without connector counterweights due to the magnitude of the inertia forces through midstroke. In these cases, the reciprocating mechanism would fall behind the crankpin as it passed through midstroke resulting in excessive forces and friction as it caught back up after midstroke or it may even jam.

Mechanism 8A is equally applicable to gasoline engines as well as diesels even though FIGS. 9 and 10 primarily described a diesel engine application. This reflects the desire to move the consumer toward the more energy efficient engine cycle especially since this design provides a number of features that would make a diesel engine more attractive to a broader base of consumers.

Some advantages are: (1) the cost savings and simplicity of a one cylinder diesel engine with as many power strokes per revolution as a four cylinder four cycle diesel is attractive; (2) the inertia forces can be totally balanced with but three moving assemblies: the crank assembly, the novel connector, and the reciprocating member; (3) a single cylinder engine has lower heat losses than a four cylinder engine; (4) a single cylinder diesel engine is easier to preheat for cold weather starts; (5) since only one piston is required and since that piston does not experience side thrust forces, more sophisticated piston designs in exotic materials are cost effective, piston weight can be reduced and diesel engine RPM can be increased and engine size decreased by increasing piston/cylinder temperatures through the use of higher temperature materials; (6) a single cylinder engine with only one piston encounters lower frictional forces than four cylinder engine; and (7) the smaller size and the lower center of mass makes the engine design attractive in the transportation industry.

One specific subset of connector counterweights, for convenience and ease of illustration, has been described for a mechanism with a stroke that is four times the crankpin offset that can be fully balanced with just one crank, one reciprocating mechanism, and one connector where kinetic energy is transferred back and forth between the connector and the reciprocating mechanism instead of the crank and the reciprocating member thus eliminating excessive forces on the secondary interface due to inertia forces and eliminating fluctuations in crank velocity under no load conditions. As described in connection with FIGS. 1–7 and 8a–8f, this can be accomplished by the addition of connector counterweights so that the magnitude of the connector translational momentum in the direction perpendicular to the axis of reciprocation is equal to but 90 degrees out of phase with the translational momentum of the reciprocating member in the axis of reciprocation and where the magnitude of the translational momentum of the connector in the direction of reciprocation is zero. This can also be accomplished by the addition of connector counterweights so that the magnitude of the connector translational momentum in the direction perpendicular to the axis of reciprocation is equal to but 90 degrees of phase with the combined translational momentum of the reciprocating member and the connector in the direction of the axis of reciprocation and where FIGS. 1–7 and 8a–8f show a specific subset of this motion where the magnitude of the translational momentum of the connector in the direction of reciprocation was zero.

Without the novel use of connector counterweights, the motion of the connector center of mass is substantially an ellipse with the major axis on the axis of reciprocation. The ellipse defining the motion of the connector center of mass approaches or becomes a straight line falling on the axis of reciprocation for the most basic connector. The crank not only accelerates and decelerates the reciprocating member in the axis of reciprocation but also the connector.

However, the addition of connector counterweights can be used to change the location of the connector center of mass and its resulting motion in unique ways unlike the effect of adding crank counterweights. The addition of connector counterweights changes the shape and size of the elliptical motion of the connector center of mass and advantageously capitalizes on the unique motion of the connector which is again is defined by combined motion of the primary mechanism plus the secondary interface through midstroke.

The minor axis of the ellipse defining the motion of the connector center of mass increases with the addition of connector counterweights on the side of the connector opposite the hole receiving the crankpin as is the connector center of rotation. Counterweights can continue to be added to the side opposite the center of connector rotation until the center of the hole receiving the crankpin will become the center of mass for the connector. This geometry results in a motion for the connector center of mass that coincides with the motion of the center of the crankpin. The minor axis of the elliptical motion of the connector in a direction perpendicular to the axis of reciprocation is now equal to the major axis in the direction of reciprocation resulting in a circle with a diameter that is twice the crankpin offset. The combined motion of the connector and the reciprocating member is now such that the crank accelerates and decelerates only the reciprocating member since the magnitude of the momentum of the connector remains constant. The energy of the connector also remains constant.

The further addition of connector counterweights can be used to extend the connector center of mass away from the hole receiving the crankpin in the direction opposite the center of connector rotation. This, in effect, increases the velocity and the resulting energy of the connector in the direction perpendicular to the axis of reciprocation as compared to its velocity and resulting energy in the direction of reciprocation.

The energy of the connector is thus greater at the top of the stroke When the reciprocating member has zero energy than the energy of the connector at midstroke when the reciprocating member is at its maximum energy. This reduce the transfer of energy back and forth between the crank and the reciprocating member. The motion of the connector center of mass, again, becomes an ellipse, this time with the major axis perpendicular to the axis of reciprocation. Once again the crank must accelerates and decelerates the connector but primarily in the axis perpendicular to the axis of reciprocation and 90 degrees out of phase with acceleration and deceleration of the reciprocating member.

To summarize, the motion of the connector center of mass is defined as an ellipse with the magnitude of the connector's momentum and the resulting transfer of energy between the crank and the connector/reciprocating mechanism being dependent on the direction of the major axis of the ellipse. Three conditions exist, which are: (1) when the major axis of the ellipse defining the motion of the connector's center of mass is on the axis of reciprocation, then the motion of the connector is in phase with the reciprocating member thus increasing the transfer of energy back and forth from the crank; (2) when the major axis of the ellipse defining the motion of the connector's center of mass is on neither axis in the case of a circle, then the motion of the connector is a circle having no affect on the transfer of energy back and forth from the crank; and (3) when the major axis of the ellipse defining the motion of the connector's center of mass is on the axis perpendicular to the axis reciprocation, then the motion of the connector is out of phase with the reciprocating member thus reducing the transfer of energy back and forth from the crank.

The use of connector counterweights addresses condition 3 to minimize the transfer of energy back and forth from the crank to reduce loads on the secondary interface through midstroke. The amount of energy transferred back and forth from the crank as described in condition 3 is further dependent on the shape of the ellipse and the mass of the connector relative to the mass of the reciprocating member.

Condition 3, in which the motion of the connector center of mass is an ellipse with the major axis perpendicular to the axis of reciprocation, cam be further broken down into three subsets of motion all of which can reduce/eliminate the transfer of energy back and forth between the crank and the reciprocating member.

One of the three conditions is the subset of motion as shown FIGS. 1–7 and 8a–8f where the mass of connector 14 is equal to the mass of reciprocating member 10 and where the distance from the center of crankpin 52 to the connector center of mass 56 is equal and opposite the distance from the center of crankpin 52 to the center of connector rotation 54. The ellipse for this motion becomes a straight line as the minor axis of the ellipse goes to zero. The magnitude of the translational momentum of connector 14 in the direction perpendicular to axis of reciprocation 53 is equal to but 90 degrees out of the phase with the combined translational momentum of reciprocating member 10 and connector 14 in the direction of the axis of reciprocation 53.

In the specific case shown in FIGS. 1–7 and 8a–8f the magnitude of the translational momentum of connector 14 in the direction of the axis of reciprocation 53 is zero thus the magnitude of the translational momentum of connector 14 in the direction perpendicular to the axis of reciprocation 53 is equal to but 90 degrees out of phase with the translational momentum of reciprocating member 10 in the direction of the axis of reciprocation 53.

In the two other cases, the magnitude of the translational momentum of the connector in the direction perpendicular to the axis of reciprocation is equal to but 90 degrees out of phase with the combined translational momentum of the reciprocating member and the connector in the direction of reciprocation. In one case the mass of the connector is greater than the mass of the reciprocating member and the direction of rotation of the elliptical motion of the connector's center of mass is in the same direction of rotation as the crankpin while in the other case the mass of the connector is less than the mass of reciprocating member and the direction of rotation of the connector's center of mass is in the opposite direction. In both cases the distance from the crankpin center to the connector center of mass is equal to the crankpin offset (distance from the crankpin center to the center of connector rotation) times the mass of the reciprocating member divided the mass of the connector.

FIGS. 11a–11d are four successive stages in a developed view illustrating the use of connector 14 whose mass is twice that of reciprocating member 10 while FIGS. 12a–12d are four successive stages in a developed view illustrating the use of connector 14 whose mass is one half that of reciprocating member 10. This distance from crankpin center 52 to connector center of mass 56 is one half the crankpin offset and twice the crankpin offset respectfully.

In FIGS. 11a–11d the center of crank rotation is 50A, the crankpin center is 52G, 52H, 52I, and 52J for 0, 30, 60 and 90 degrees respectively, the center of connector rotation is 54G, 54H, 54I and 54J for 0, 30, 60, and 90 degrees respectively, and the connector center of mass is 56G, 56H, 56I, and 56J for 0, 30, 60, and 90 degrees respectively. The crankpin center, the center of connector rotation, and the connector center of mass will still be referred to as 52, 54, and 56 respectfully unless a specific angle is referenced. The distance from crankpin center 52 to the center of connector rotation 54 is one crankpin offset as defined earlier for mechanisms with a stroke four times the crankpin offset. The distance from crankpin center 52 to the connector center of mass 56 is one half the crankpin offset since the mass of the connector 14 is twice that of the reciprocating member 10.

The velocity of the connector center of mass 56 in the direction perpendicular to the axis of reciprocation is 1.5 times crankpin center 52 in the same direction. This can be best shown in FIG. 11a at 0 degrees where the center of connector rotation 54G has zero velocity at the top of the stroke and the distance from the center of connector rotation 54G to the connector center of mass 56G is 1.5 times the crankpin offset. The velocity of the connector center of mass 56 in the direction of reciprocation is 0.5 times crankpin center 52 in the same direction. This is shown in FIG. 11d at 90 degrees where at midstroke the center of connector rotation 54J has a velocity that is twice that of crankpin center 52J in the direction of reciprocation, and the velocity of connector center of rotation 54J and crankpin center 52J have zero velocities in the direction perpendicular to the axis of reciprocation, and where the distance from the center of connector rotation 54J to the connector center of mass 56J is again 1.5 times the crankpin offset.

Figure 11A:
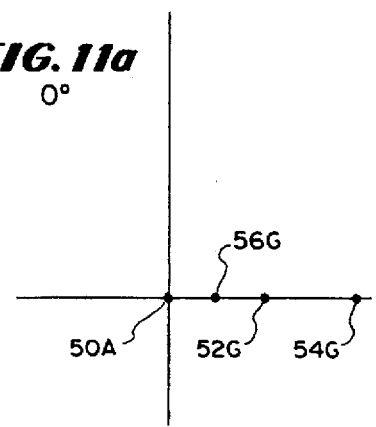
FIG. 11a is a diagramatic view of a first stage of a series of four stages showing the development of another embodiment of the invention having a center of crank rotation, the crankpin center, the center of connector rotation and the connector center of mass for zero degrees.
Figure 11B:
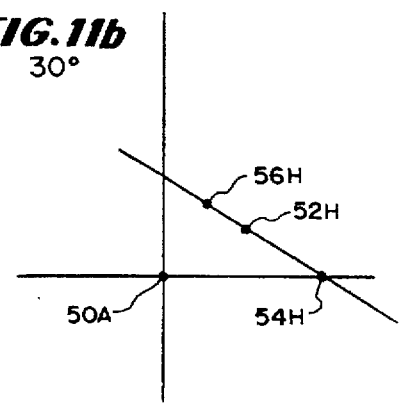
FIG. 11b is a diagramatic view of a second stage of a series of four stages showing the development of another embodiment of the invention having a center of crank rotation, the crankpin center, the center of connector rotation and the connector center of mass for 30 degrees.
Figure 11C:
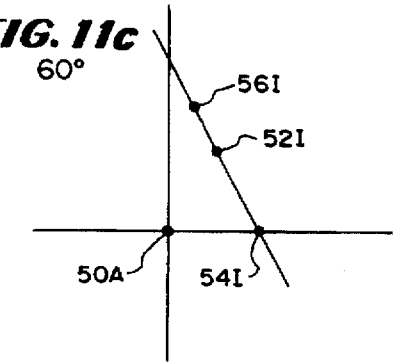
FIG. 11c is a diagramatic view of a third stage of a series of four stages showing the development of another embodiment of the invention having a center of crank rotation, the crankpin center, the center of connector rotation and the connector center of mass for 60 degrees.
Figure 11D:
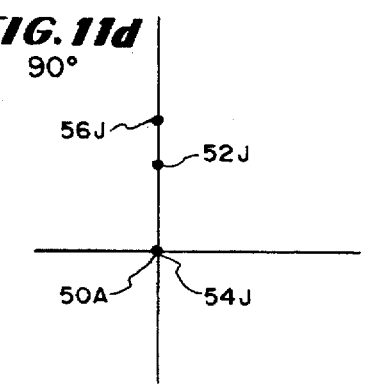
FIG. 11d is a diagramatic view of a fourth stage of a series of four stages showing the development of another embodiment of the invention having a center of crank rotation, the crankpin center, the center of connector rotation and the connector center of mass for 90 degrees.
Figure 12D:
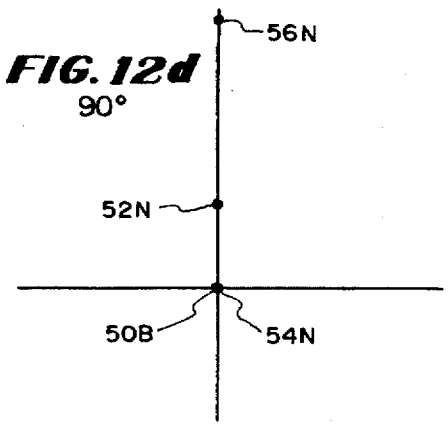
FIG. 12d is a diagramatic view of a fourth stage of a developed view having four stages FIGS. 12a–12d of still another embodiment of the invention showing the center of crank rotation, the crankpin center, the center of connector rotation and the connector center of mass for 90 degrees.

The magnitude of the combined momentums for FIG. 11a is shown in equations 11–13 where P is momentum, Mr is the mass of reciprocating member 10, Mc is the mass of connector 14, [Vcp] is the absolute velocity of the crankpin center 52, 2[Vcp]*(−sin theta) is velocity of the reciprocating member 10 in the direction of reciprocation, (0.5[Vcp])*(−sin theta) is the velocity of the connector in the direction of reciprocation, and (1.5[Vcp])*(cos theta) is the velocity of connector center of mass 56 in the direction perpendicular of the axis of reciprocation. Since Mc=twice Mr, equation 11 can be combined into equation 12. Equation 12 can reduced to equation 13. Thus P=Mr*(3Vcp) where P is the combined momentum of reciprocating member 10 and the connector 14 which has mass that is twice and the mass of the reciprocating member 10. The combined momentum is equal to 3 times the mass of the reciprocation member 10 times the directional velocity of the crankpin center 52.

The terms combine in equation 12 from equation 11 such that the momentum of connector 14 in the direction perpendicular to the axis of reciprocation is equal to and 90 degrees out of phase with the combined momentum of reciprocating member 10 and Equation 11

$$P=Mr*(2[Vcp])*(-\sin\text{ theta})+Mc*(0.5[Vcp])*(-\sin\text{ theta})+Mc*(1.5[Vcp])*(\cos\text{ theta})$$

Equation 12

$$P=Mr*(3[Vcp])*(-\sin\text{ theta})+Mr*(\cos\text{ theta})=Mr*(3[Vcp])*(-\sin\text{ theta}+\cos\text{ theta})$$

Equation 13

$$P=Mr*(3[Vcp])$$

connector 14 in the direction of reciprocation. Also the terms combine in equation 13 such that the magnitude of the combined momentum remains constant.

FIGS. 12a–12d illustrates the use of a connector 14 whose mass is one half that of the reciprocating member 10. The distance from crankpin center 52 to the connector center of mass 56 is twice the crankpin offset. In FIG. 12 the center of crank rotation is 50B, the crankpin center is 52K, 52L, 52M, and 52N for 0, 30, 60, and 90 degrees respectively, the center of connector rotation is 54K, 54L, 54M and 54N for 0, 30, 60, and 90 degrees respectively, and the connector center of mass is 56K, 56L, 56M, and 56N for 0, 30, 60, and 90 degrees respectively. The crankpin center, the center of connector rotation, and the connector center of mass will again be referred to as 52, 54, and 56 respectfully unless a specific angle is referenced. The distance from crankpin center 52 to the center of connector rotation 54 is again one crankpin offset. The distance from crankpin center 52 to connector center of mass 56 is twice the crankpin offset since the mass of connector 14 is one half the mass of reciprocating member 10.

The velocity of the connector center of mass 56 in the direction perpendicular to the axis of reciprocation is 3.0 times crankpin center 52 in the same direction. This can be best shown in FIGS. 12a–12d at 0 degrees where the center of connector rotation 54K has zero velocity at the top of the stroke and the distance from the center of connector rotation 54K to the connector center of mass 56K is 3 times the crankpin offset. The velocity of the connector center of mass 56 in the direction of reciprocation is the same as the velocity of the crankpin center 52 but in the opposite direction. This can be best shown in FIG. 12d at 90 degrees where at midstroke the center of connector rotation 54N has a velocity that is twice that of crankpin center 52N in the direction of reciprocation, and the velocity of connector center of rotation 54N and crankpin center 52N have zero velocities in the direction perpendicular to the axis of reciprocation, and where the distance from the center of connector rotation 54N of the connector center of mass 56N is again 3 times the crankpin offset.

Figure 12A:
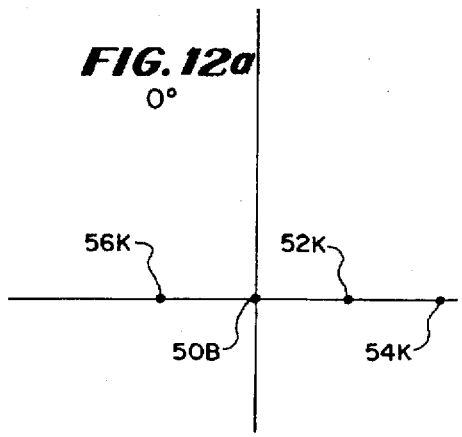
FIG. 12a is a diagramatic view of a first stage of a developed view having four stages FIGS. 12a–12d of still another embodiment of the invention showing the center of crank rotation, the crankpin center, the center of connector rotation and the connector center of mass for zero degrees.
Figure 12B:
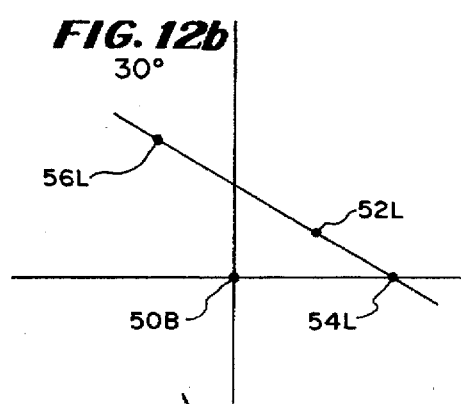
FIG. 12b is a diagramatic view of a second stage of a developed view having four stages FIGS. 12a–12d of still another embodiment of the invention showing the center of crank rotation, the crankpin center, the center of connector rotation and the connector center of mass for 30 degrees.
Figure 12C:
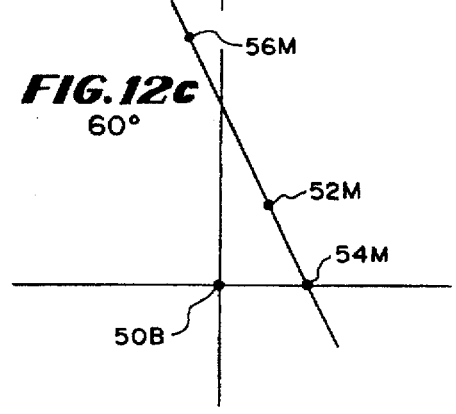
FIG. 12c is a diagramatic view of a third stage of a developed view having four stages FIGS. 12a–12d of still another embodiment of the invention showing the center of crank rotation, the crankpin center, the center of connector rotation and the connector center of mass for 60 degrees.

The magnitude of the combined momentums for FIG. 12a is shown in equations 14–16, where P is momentum, Mr is the mass of reciprocating member 10, Mc is the mass of connector 14, [Vcp]is the absolute velocity of crankpin center 52, 2[Vcp]*(–sin theta) is the velocity of reciprocating member 10 in the direction of reciprocation, (–[Vcp])*(–sin theta) is the velocity of the connector center of mass 56 in the direction of reciprocation, and (3[Vcp])*(cos theta) is the velocity of the connector center of mass 56 in the direction perpendicular to the axis of reciprocating.

Since Mc=0.5 *Mr, equation 14 can be combined into equation 15. Equation 15 can be reduced to equation 16. Thus P=Mr*(1.5Vcp) where P is the combined momentum of reciprocating member 10 and connector 14 whose mass is half the mass of the reciprocating member 10. The combined momentum equal to 1.5 times the mass of reciprocation member 10 times the directional velocity of the crankpin center 52.

The terms combine in equation 15 from equation 14 such that the momentum of connector 14 in the direction perpendicular to the axis of reciprocation is equal to and 90 degrees of phase with the combined momentum of reciprocating member 10 and connector 14 in the direction of reciprocation. Also note that the terms combine in equation 16 such Equation 14

$$P=Mr*(2[Vcp])*(-\sin \text{theta})+Mc*(-[Vcp])*(-\sin \text{theta})+Mc*(3[Vcp])*(\cos \text{theta})$$

Equation 15

$$P=Mr*(1.5[Vcp])*(-\sin \text{theta})+Mr*(1.5\{Vcp])*(\cos \text{theta})=Mr*(1.5[Vcp])*(-\sin \text{theta}+\cos \text{theta})$$

Equation 16

$$P=Mr*(1.5[Vcp])$$

that the magnitude the combined momentum remains constant.

Crank counterweights 62A and 62B as described in FIG. 1 can once again be used to fully balance the mechanism since the combined magnitude of the momentums of connector 14 and reciprocating member 10 remain constant with a direction the same as crankpin center 52.

The combined energy of connector 14 and reciprocating member 10 in FIGS. 11a–11d remains constant throughout the entire stroke. This is best seen in equation 17, where E is energy, M is mass, V is velocity, Mr is the mass of reciprocating member 10, Vr is the velocity of reciprocating member 10, Mc is the mass of connector 14, Vc is the velocity of the connector center of mass 56, [Vcp] is the nondirectional magnitude of the velocity of crankpin center 52, (2[Vcp]*(–sin theta) is the velocity of the reciprocating member 10 in the direction of reciprocation, (0.5[Vcp])*(–sin theta) is the velocity of the connector center of mass 56 in the direction of reciprocation and (1.5[Vcp])*(cos theta) is the velocity of the connector center of mass 56 in the direction perpendicular to the axis of reciprocation.

The resulting energy of reciprocating member 10 and connector 14, for FIG. 11 where the mass of connector 14 is twice that of the reciprocating member 10 and where the distance from crankpin center 52 to the connector center of mass 56 is one half the distance from the crankpin center 52 to the center of connector rotation 54 (crankpin offset), is 2.25 times the mass of the reciprocating member times the velocity squared of crankpin center 52. It is important to note that the energy is unchanging in equation 18. The terms combine such that the energy is constant throughout the stroke thus eliminating the transfer of energy back and forth between crank 14 and reciprocating member 10/connector 14.

The combined energy of connector 14 and the reciprocating member 10 in FIG. 12 remains constant throughout the entire stroke. This is best seen in equation 19, where again E is energy, M is mass, V is velocity, Mr is the mass of reciprocating member 10, Vr is the velocity of reciprocating member 10, Mc is the mass of connector 14, Vc is the velocity of the connector center of mass 56, [Vcp] is the non directional magnitude of the velocity of crankpin Equation 17

$$E=1/2MV^2=1/2MrVr^2+1/2McV^2=1/2Mr*[(2[Vcp]*(-\sin \text{theta})]^2+1/2Mc*([(0.5[Vcp])*(-\sin \text{theta})]^2+[1.5[Vcp])*(\cos \text{theta})]^2)$$

Equation 18

$$E=2Mr*[Vcp]^2*(-\sin \text{theta})^2+0.25Mr*[Vcp]^2*(-\sin \text{theta})^2+2.25Mr*[Vcp]^2*(\cos \text{theta})^2=2.25Mr*[Vcp]^2*[(-\sin \text{theta})^2+(\cos \text{theta})^2]=2.25Mr*Vcp^2$$

center 52, (2[Vcp]*(–sin theta) is the velocity of reciprocating member 10 in the direction of reciprocation. Also, (–1[Vcp])*(–sin theta) is the velocity of the connector center of mass 56 in the direction of reciprocation 53 and (3[Vcp])*(cos theta) is the velocity of the connector center of mass 56 in the direction perpendicular to the axis of reciprocation 53.

The resulting energy of reciprocating member 10 and connector 14, for FIGS. 12a –12d where the mass of connector 14 is one half that of reciprocating member 10 and where the distance from crankpin center 52 of the connector center of mass 56 is twice the distance from crankpin center 52 to the center of connector rotation 54 (crankpin offset), is again 2.25 times the mass of reciprocating member 10 times the velocity squared of crankpin center 52. The resultant energy will not always be 2.25 times the mass of reciprocating member 10 times the velocity squared of crankpin center 52 as is in the case in both equations 18 and 20. Different ratios of the mass of connector 14 of the mass of reciprocating member 10 will result in different energies.

Equation 19

$$E=1/2MV^2=1/2MrVr^2+1/2McV^2=1/2Mr*[(2[Vcp]*(-\sin \text{theta})]^2+1/2Mc*([(-1[Vcp])*(-\sin \text{theta})]^2+[(3[Vcp])*(\cos \text{theta})]^2)$$

Equation 20

$$E=2Mr*[Vcp]^2*(-\sin \text{theta})^2+0.25Mr*[Vcp]^2*(-\sin \text{theta})^2+2.25Mr*[Vcp]^2*(\cos \text{theta})^2=2.25Mr*[Vcp]^2*[(-\sin \text{theta})^2+(\cos \text{theta})^2]2.25Mr*Vcp^2$$

In the special case described by FIGS. 1–7 and 8a–8f the energy is 2 times the mass of reciprocating member 10 times the velocity squared of crankpin center 52. The energy is unchanging in equation 20. The terms combine such that the energy is constant throughout the stroke thus eliminating the transfer of energy back and forth between crank 14 and the reciprocating member 10/connector 14.

To aid in visualizing the motion of the 3 conditions, as illustrated in FIGS. 8a–8f, FIGS. 11a–11d and FIGS. 12a–12d, imagine: (1) a crankpin rotating around a crank center with an angular velocity in a direction of rotation; (2) the connector and the reciprocating member as points masses both on a line passing through the crankpin center where the line is rotating with an angular velocity equal but in a direction opposite that of the crankpin center; and (3) the distance from the crankpin center to the point mass of the reciprocating member to be equal to the crankpin offset and that the point mass of the reciprocating member is confined to straight line motion passing through the crank center while it rotates around the crankpin with an angular velocity equal to but in a direction opposite that of the crankpin around the crank center.

The above hypothetical situation may be applied to all three cases. In case 1, if the point masses of the connector and the reciprocating member are equal and their distances from the crankpin center are equal to the crankpin offset, the case is illustrated in FIGS. 8a–8f. The magnitude of the angular momentum and the kinetic energy must remain constant since the center of mass of the connector and the reciprocating member coincides with the crankpin center.

In a second case, as illustrated in FIGS. 11a–11d (1) the point mass of the connector is greater than the point mass of the reciprocating member; and (2) the distance from the crankpin to the point mass of the connector is equal to the crankpin offset times the mass of the reciprocating member divided by the mass of the connector. The magnitude of the angular momentum and the kinetic energy must remain constant since the a center of mass of the connector and the reciprocating member coincides with the crankpin center and the motion of the point mass of the connector travels in an ellipse with angular direction the same as the crankpin since the distance from the crankpin center to the point mass of the connector is less than one crankpin offset. The major axis is perpendicular to the line to which the point mass of the reciprocating member is confined.

In a third case, as illustrated in FIGS. 12a–12d (1) the point mass of the connector is less than the point mass of the reciprocating member; and (2) the distance from the crankpin to the point mass of the connector is equal to the crankpin offset times the mass of the reciprocating member divided by the mass of the connector. In this case, the magnitude of the angular momentum and the kinetic energy must remain constant since the center of mass of the connector and the reciprocating member coincides with the crankpin center and the motion of the point mass of the connector will travel in an ellipse with angular direction opposite as the crankpin since the distance from the crankpin center to the point mass of the connector is greater than one crankpin offset. The major axis is again perpendicular to the line to which the point mass of the reciprocating member is confined.

The combined energy of the connector and the reciprocating member is the least for case 1 as described in FIGS. 1–7 and 8a–8f. However the magnitude of the combined momentums is the least for case 3 (FIGS. 12a–12d) where the mass of the connector is less than the mass of the reciprocating member. Combined momentum and resulting frictional forces on the crankpin due to inertia will continue to drop as the mass of the connector decreases. However, due to structural design constraints, case 2 (FIGS. 11a–11d) may be more typical although it is generally desirable to minimize the mass of the connector within those restraints.

Mechanism 8, as described in FIG. 1 but expanded to cover FIGS. 11a–11d and 12a–12d where the mass of reciprocating member 10 and connector 14 are not equal, can fully balanced by the addition of crank counterweights 62A and 62B that late opposite crankpin center 52 on a line passing through crankpin center 52 and crank center 50 and that are sized to oppose the momentums of reciprocating member 10 and connector 14 whose primary momentums are perpendicular and 90 degrees out of phase with each other and when combined act centrally on crankpin center 52 with constant momentum that is equal to the combined mass of reciprocating member 10 and the connector 14 times the directional velocity of crankpin center 52.

In the specific subset where the mass of reciprocating member 10 equals the mass of connector 14, the momentum of crank counterweights 62A and 62B is twice the mass of reciprocating member 10 times the directional velocity of crankpin center 52 as shown earlier in Equation 10. However, in FIGS. 11a–11d and 12a–12d the masses of reciprocating member 10 and connector 14 are no longer equal and the required momentum of crank counterweights 62A and 62B to fully balance mechanism 8 will be equal to the combined masses of reciprocating member 10 and the connector 14 times the directional velocity of crankpin center 52.

As described earlier in connection with FIGS. 11a–11d, the magnitude of the combined momentum of reciprocating member 10 and connector 14 was three times the mass of reciprocating member 10 times the velocity of the crankpin center 52 with a combined directional momentum of three times the mass of reciprocating member 10 times the velocity of crankpin center 52. This may be best see from earlier equations 13 and 12. In equation 13, P=Mr*(3[Vcp]), and in equation 12, P=Mr*(3[Vcp]*(−sin theta+cos theta) where the magnitude of the momentum remains unchanged throughout the stroke and in a direction of the velocity of crankpin center 52. Again, P is momentum, Mr is the mass of reciprocating member 10, and [Vcp] is the absolute velocity of the crankpin center 52. The direction of the velocity of crankpin center 52 and the direction of the combined momentum of reciprocating member 10 and connector 14 is given by the (−sin theta +cos theta) term Mechanism 8 can be fully balanced by the addition of crank counterweights 62A and 62B to crank assembly 12 that have the same absolute momentum as the combined translational momentum of reciprocating member 10 and connector 14 and that have an orientation opposite crank center 50 as is crankpin center 52. Crank counterweights 62A and 62B have momentums shown in equation 21 where $P_{cc}$ is the momentum, $M_{cc}$ is the mass, and $V_{cc}$ is the velocity of the crank counterweights 62A and 62B.

As described earlier in connection with FIGS. 12a–12d, the magnitude of the combined momentum of reciprocating member 10 and connector 14 was 1.5 times the mass of reciprocating member 10 times the velocity of the crankpin center 52 with a combined directional momentum of 1.5 times the mass of reciprocating member 10 times the velocity of crankpin center 52.

This may be understood from earlier equations 16 and 15, since in equation 16, P=Mr*(1.5[Vcp]), and in equation 15, P=Mr*(1.5[Vcp]*(−sin theta+cos theta) where the magnitude of the momentum remains unchanged throughout the stroke and in a direction of the velocity of crankpin center 52, P is momentum, Mr is the mass of reciprocating member 10, and [Vcp] is the absolute velocity of the crankpin center 52. The direction of the velocity of crankpin center 52 and the direction of the combined momentum of reciprocating member 10 and connector 14 is given by the (−sin theta+cos theta) term.

Mechanism 8 can be fully balanced by the addition of crank counterweights 62A and 62B to crank assembly 12 that have the same absolute momentum as the combined translational momentum of reciprocating member 10 and connector 14 and that have an orientation opposite crank center 50 as is crankpin center 52. Crank counterweights 62A and 62B have momentums shown in equation 22 where $P_{cc}$ is the momentum, $M_{cc}$ is the mass, and $V_{cc}$ is the velocity of the crank counterweights 62A and 62B.

The inertia forces of crank counterweights 62A and 62B are thus outward from crank center 50 in a direction opposite crankpin center 52 and are of Equation 21

$$P_{cc}=M_{cc}*V_{cc}=-M_r*(3V_{cp})=-P$$

Equation 22

$$P_{cc}=M_{cc}*V_{cc}=-M_r*(1.5V_{cp})=-P$$

equal magnitude of the combined translational inertia forces of reciprocating member 10 and connector 14. The outward (centrifugal) inertia forces of crank counterweights 62A and 62B thus oppose the translational inertia forces of connector 14 at midstroke in both directions and opposes the combined translational forces of reciprocating member 10 and connector 14 at the ends of the stroke and between midstroke and the ends of the stroke. However, the size of crank counterweights 62A and 62B are different compared to reciprocating member 10 as seen from equations 10, 21, and 22.

The size of crank counterweights 62A and 62B will decrease as the mass of connector 14 relative to the mass of reciprocating member 10 decreases. It is thus desirable to reduce the mass of connector 14 to further minimize frictional forces, but this is design limited. The connector can physically be reduced in size only so much. Also, to eliminate the transfer of energy back and forth from crank 12, the distance from the connector center of mass 56 to crankpin center 52 is equal to the distance from the center of connector rotation 54 to crankpin center 52 (crankpin offset) in the opposite direction times the mass of reciprocating member 10 divided by the mass of connector 14.

It is to be understood that the novel use of connector counterweights can be practiced other than specifically described to eliminate or to reduce the transfer of energy back and forth between the crank and the reciprocating member. One example would be the use of counterweights to achieve connector motion in the form of an ellipse perpendicular to the axis of reciprocation where the mass of the connector 14 does not equal the mass of reciprocating member assembly 10 times the distance from the crankpin center 52 to the center of connector rotation 54 (the crankpin offset) divided by the distance from the crankpin center 52 to the connector center of mass 56 in the opposite direction. This arrangement may purposely be used to allow some transfer of energy back and forth between the crank 14 and reciprocating member 10 to help reduce fluctuations in angular crank velocity in low to medium high speed mechanisms under high external loads on the reciprocating member. Generally, the distance from crankpin center 52 to the connector center of mass 56 would be limited to value between about 0.5 and 2 times the distance of crankpin center 52 to the center of connector rotation 54 times the mass of reciprocating member 10 divided by the mass of connector 14 and connector center of mass 56 would be in a direction opposite crankpin 52 as is the center of connector rotation 54.

Although a preferred embodiment of the invention is described with some particularity, many modifications and variation of the preferred embodiment may be made without deviating from the invention. Accordingly, it is to be understood that, within the scope of the appended claims, the invention may be practiced other than as specifically described.

What is claimed is:

1. Apparatus comprising:
    at least one reciprocating member confined to an axis of reciprocation:
        at least one rotating member with a crankpin;
        said crankpin having a crankpin offset; and
        at least one connector means connecting the reciprocating member and the rotating member for converting at least one of rotating motion of the rotating member to reciprocating motion of the reciprocating member and reciprocating motion of the reciprocating member to rotating motion of the rotating member during each of a plurality of cycles of reciprocating motion of the reciprocating member from a first position to a second position and back to the first position;
    said reciprocating member having a stroke length that is four times the length of the crankpin offset;
    said connector means having a momentum;
    said momentum having a translational momentum component in a direction perpendicular to the axis of reciprocation and a translational momentum component in a direction of reciprocation;
    a connector means having a magnitude of translational momentum component in the direction perpendicular to the axis of reciprocation being of a magnitude that is larger than said translational momentum component in the direction of reciprocation;
    said reciprocating member and said connector means having a magnitude of combined translational momentum in the direction of reciprocation;
    said magnitude of translational momentum component in the direction perpendicular to the axis of reciprocation being substantially 90 degrees out of phase with said magnitude of combined translational momentum in said direction of reciprocation.

2. Apparatus, according to claim 1 further including a secondary interface between said at least one rotating member and said at least one reciprocating member for controlling motion through only a predetermined distance of midstroke to force and maintain continuity of reciprocating member movement through midstroke consistent with the rest of the stroke.

3. Apparatus according to claim 1 further including a secondary interface between said at least one connector means and a housing for controlling motion through only a predetermined distance of midstroke of said reciprocating member so as to force and maintain continuity of reciprocating member movement through midstroke consistent with the rest of the stroke.

4. Apparatus comprising:
    at least one reciprocating member confined to an axis of reciprocation;

at least one rotating member with a crankpin; and at least one connector means connecting the reciprocating ember and the rotating member for converting at least one of rotating motion of the rotating member to reciprocating motion of the reciprocating member and reciprocating motion of the reciprocating member to rotating motion of the rotating member during each of a plurality of cycles of reciprocating motion of the reciprocating member from a first position to a second position and back to the first position;

said connector means having a magnitude of translational momentum component in a direction perpendicular to the axis of reciprocation;

said reciprocating member and said connector means having a magnitude of combined translational momentum component in a direction of reciprocation;

said magnitude of translational momentum in a direction perpendicular to the axis of reciprocation being substantially equal and 90 degrees out of phase with said magnitude of combined translational momentum in the direction of reciprocation.

5. Apparatus according to claim 4 wherein kinetic energy is transferred back and forth between said connector means and said reciprocating member and not between a crank and said reciprocating member; and combined kinetic energy of said connector means and said reciprocating member remains substantially constant unless an RPM of said crank changes due to external forces.

6. Apparatus according to claim 4 in which:

said at least one reciprocating member includes at least one rod assembly;

said at least one rod assembly being adapted to be reciprocated within a housing in a first direction and a second direction one hundred and eighty degrees from the first direction;

said reciprocating member having a mass;

said rotating member including a crank having an axis of crank rotation and at least one crankpin having a center;

said at least one connector means being adapted to be attached to said at least one crankpin;

said at least one connector means being adapted to be attached to said at least one rod assembly;

said at least one connector means having at least one connector counterweight and having a mass and a center of mass; and said center of mass of said connector means having a distance from said crankpin center in a direction opposite of a center of connection means rotation that is substantially equal to the distance from the crankpin center to the center of rotation of said connector means times the mass of the reciprocating member divided by the mass of the connector means.

7. Apparatus according to claim 6 in which said connector means mass is substantially equal to said mass of said reciprocating member.

8. Apparatus according to claim 6 wherein inertia forces are created by motion and the inertia forces are fully balanced.

9. Apparatus according to claim 6 in which:

the center of said at least one crankpin has a radius of crank rotation about the axis of crank rotation;

said at least one rod assembly has a stroke length of travel;

said connector means has a center of connector means rotation;

a first distance from the center of connector means rotation of the center of said crankpin being equal to said radius of crank rotation;

a second distance from the center of mass of said connector means of the crankpin center being equal to said radius of crank rotation times the mass of said reciprocating member divided by the mass of said connector means;

a stroke length of travel being equal to four times the radius of crank rotation, whereby the connector means rotates with an angular velocity the same as but in a direction opposite that of the crank wherein the center of connector means rotation rotates around said crankpin with an angular velocity the same as but in a direction opposite that of the crank, whereby said stroke length of travel of said reciprocating member is equal to substantially four times the radius of crank rotation with said center of connector means rotation reciprocating along an axis of reciprocation passing through a center of crank rotation and said connector means center of mass rotates around said crankpin center with an angular velocity the same as but in a direction opposite that of the crank, whereby said connector means center of mass travels in a substantially elliptical path with its major axis perpendicular to the axis of reciprocation passing through said center of crank rotation; said connector means center of mass being at its maximum velocity when said center of connector means rotation is at the top of a stroke and at the bottom of a stroke; and said connector means center of mass being at its minimum velocity when said center of connector mean rotation is at midstroke.

10. Apparatus according to claim 9 in which: said crank includes crank counterweights;

said crank counterweight oppose inertia forces of said at least one connector means in the direction perpendicular to the axis of reciprocation; and said crank counterweights oppose the combined inertia forces of said at least one reciprocating member and said at least on connector means in the direction of reciprocation.

11. Apparatus according to claim 10 wherein inertia forces are created by motion and the inertia forces are fully balanced.

12. Apparatus according to claim 9, further comprising:

at least one cylinder;

said reciprocating member including at least one piston;

said at least one cylinder having walls in which said at least one piston reciprocates therein forming at least one chamber.

13. Apparatus according to claim 12 in which multiple said pistons and their respective cylinders apply force to said crank at substantially equally spaced intervals to minimize torsional vibrations.

14. Apparatus according to claim 6 in which:

said at least one connector means has a hole that receives said at least one crankpin, and a cylindrical portion with a center of connector means rotation that is rotatably attached to said at least one reciprocating member;

said at least one crankpin having a crankpin center and a radius of crank rotation;

said hole in said at least one connector means that receives said at least one crankpin having a center that is on a line between said connector means center of mass and said center of connector means rotation whereby the distance from the center of said hole to said center of connector means rotation is equal to the radius of crank rotation and the distance from the center of said hole to said connector means center of mass is substantially equal to the radius of crank rotation times the mass of said reciprocating member divided by the mass of said connector means; wherein said center of rotation of said connector means rotates around said at least one crankpin with equal but opposite angular velocity as said crankpin rotates around said crank axis whereby said center of rotation of said connector means reciprocates on the axis of reciprocation with a velocity twice that of said crankpin center in a direction of the axis of reciprocation; said connector means center of mass rotating around said at least one crankpin with equal but opposite angular velocity as said crankpin rotates around said crank axis whereby said connector mean center of mass, whose motion ensues from a connector means geometry, the combined motion of the crankpin center and the center of connector means rotation, travels in a path that is substantially elliptical with a major axis in the direction perpendicular to the axis of reciprocation and a minor axis on the axis of reciprocation where the axes intersect substantially at a center of crank rotation.

15. Apparatus according to claim 14 in which said crank includes crank counterweights;

said crank counterweights oppose inertia forces of said at least one connector means in the direction perpendicular to the axis of reciprocation; and said crank counterweights oppose the combined inertia forces of said at least one reciprocating member and said at least one connector means in the direction of reciprocation.

16. Apparatus according to claim 14 in which:

said mass of at least one connector means is substantially equal to the mass of said at least one reciprocating member;

said path approaches a straight line perpendicular to the axis of reciprocation whereby said connector means center of mass oscillates on an axis perpendicular to the axis of reciprocation with a velocity substantially twice that of said crankpin center in the direction perpendicular to the axis of reciprocation.

17. Apparatus in accordance with claim 14 in which:

a magnitude of the combined momentum of said connector means and said reciprocating member remains constant through an entire stroke unless an external force is applied to the crank or to the reciprocating member; and a combined energy of said connector means and said reciprocating member remains constant through the entire stroke unless an external force is applied to the crank or to the reciprocating member.

18. Apparatus according to claim 17 further including a secondary interface;

said combined energy of said connector means and said reciprocating member remains constant through the entire stroke resulting in said secondary interface transferring substantially zero kinetic energy back and forth between a crank and the connector means/reciprocating member unless an external force is applied to said crank or to said reciprocating member.

19. Apparatus comprising:

at least one reciprocating member confined to an axis of reciprocation;

at least one rotating member with a crankpin;

at least one connector means connecting the reciprocating member and the rotating member for converting at least one of rotating motion of the rotating member to reciprocating motion of the reciprocating member and reciprocating motion of the reciprocating member to rotating motion of the rotating member during each of a plurality of cycles of reciprocating motion of the reciprocating member from a first position to a second position and back to the first position;

said reciprocating member with a stroke length of travel substantially four times a crankpin offset;

said connector means including at least one counterweight;

a center of mass of said connector means with an at least one counterweight follows a path in the form of an ellipse with a major axis perpendicular to the axis of reciprocation;

said at least one counterweight on said connector means sized and positioned to reduce but not eliminate the transfer of kinetic energy back and forth between said rotating member and said reciprocating member;

said at least one counterweight on said connector means having a weight and location so that the kinetic energy transferred from said connector means to said reciprocating member and the energy from external forces on said reciprocating member combine to minimize the transfer of energy between said rotating member and said reciprocating member through midstroke.

20. Apparatus comprising:

a crank having an axis of crank rotation and at least one crankpin;

at least one reciprocating member confined to an axis of reciprocation;

at least one connector means having a hole that receives said at least one crankpin, a cylindrical portion with a center of connector means rotation that is rotatably attached to said at least one reciprocating member, and at least one connector means counterweight;

a secondary interface, between at least one of said crank and said at least one reciprocating member or between a housing confining said reciprocating member to reciprocation and said at least one connector means;

a primary linkage between said at least one crankpin, said at least one connector means; and said at least one reciprocating member confined by the housing to reciprocation;

said at least one crankpin having a crankpin center and a radius of crank rotation;

said center of connector means rotation rotates around said at least one crankpin with equal but opposite angular velocity as said crankpin rotates around said crank axis whereby said center of connector means rotation reciprocates on the axis of reciprocation with a velocity twice that of said crankpin center in a direction of the axis of reciprocation;

said reciprocating member reciprocates on the axis of reciprocation with a velocity twice that of said crankpin center in a direction of the axis of reciprocation;

said reciprocating member has a stroke length of travel substantially four times the radius of crank rotation;

said at least one connector means having a connector means counterweight with a resulting connector means center of mass located substantially on a line opposite said hole that receives said at least one crankpin as is said center of connector means rotation;

the resulting velocity of said connector means center of mass is greatest at the top of a stroke and at the bottom of the stroke when the velocity of said at least one reciprocating member is least;

the resulting velocity of said connector means center of mass is smallest at midstroke when the velocity of said at least one reciprocating member is greatest;

the velocity, momentum, and energy of said connector means is greatest when that of said reciprocating member is least and the velocity, momentum, and energy of said connector means is least when that of said reciprocating member is greatest;

kinetic energy is thus transferred back and forth from said connector means to said reciprocating member reducing the magnitude of the kinetic energy transferred back and forth from said crank to said reciprocating member through said secondary interface.

21. Apparatus according to claim 20 in which:

the distance from said crankpin center to said connector means center of mass is substantially equal of the distance from said crankpin center to said center of connector means rotation times the mass of said reciprocating member divided by the mass of said connector means; and said center of connector means rotation said crankpin center, and said connector means center of mass are substantially on the same line.

22. Apparatus according to claim 20 in which:

the distance from said crankpin center to said connector means center of mass is between 0.5 and 2 times the distance from said crankpin center to said center of connector means rotation times the mass of said reciprocating member divided by the mass of said connector means; and said center of connector means rotation, said crankpin center, and said connector means center of mass are substantially on the same line.

* * * * *